US011343277B2

(12) United States Patent
Lv et al.

(10) Patent No.: US 11,343,277 B2
(45) Date of Patent: May 24, 2022

(54) METHODS AND SYSTEMS FOR DETECTING SPOOFING OF FACIAL RECOGNITION IN CONNECTION WITH MOBILE DEVICES

(71) Applicant: Element Inc., New York, NY (US)

(72) Inventors: Fengjun Lv, Plainsboro, NJ (US); Dushyant Goyal, Jersey City, NJ (US); Yang Wang, Princeton, NJ (US); Adam Perold, New York, NY (US)

(73) Assignee: ELEMENT INC., New York, NY (US)

( * ) Notice: Subject to any disclaimer, the term of this patent is extended or adjusted under 35 U.S.C. 154(b) by 311 days.

(21) Appl. No.: 16/815,700

(22) Filed: Mar. 11, 2020

(65) Prior Publication Data

US 2020/0296132 A1    Sep. 17, 2020

Related U.S. Application Data

(60) Provisional application No. 62/817,554, filed on Mar. 12, 2019.

(51) Int. Cl.
| | | |
|---|---|---|
| *H04L 9/40* | (2022.01) | |
| *H04L 29/06* | (2006.01) | |
| *G06N 20/00* | (2019.01) | |
| *G06V 40/40* | (2022.01) | |
| *G06V 40/16* | (2022.01) | |

(52) U.S. Cl.
CPC ......... *H04L 63/1483* (2013.01); *G06N 20/00* (2019.01); *G06V 40/166* (2022.01); *G06V 40/172* (2022.01); *G06V 40/45* (2022.01); *H04L 63/0861* (2013.01)

(58) Field of Classification Search
CPC . H04L 63/08; H04L 63/0861; H04L 63/1483; G06V 40/161; G06V 40/166
See application file for complete search history.

(56) References Cited

U.S. PATENT DOCUMENTS

| | | |
|---|---|---|
| 3,733,861 A | 5/1973 | Lester |
| 4,371,951 A | 2/1983 | Kort et al. |
| 5,067,164 A | 9/1991 | Denker et al. |

(Continued)

FOREIGN PATENT DOCUMENTS

| | | |
|---|---|---|
| AU | 2015218542 A1 | 3/2016 |
| CA | 2902093 A1 | 2/2016 |

(Continued)

OTHER PUBLICATIONS

PCT/US2020/022168 International Search Report and Written Opinion dated Jun. 3, 2020.

(Continued)

*Primary Examiner* — Khang Do
(74) *Attorney, Agent, or Firm* — Wilson Sonsini Goodrich & Rosati

(57) ABSTRACT

Described are methods, systems, and medias for detecting spoofing of biometric identity recognition and/or validating an identity recognition match by using the camera of a mobile device, processing the user's face image or set of images at a first and second distance to generate first and second data representations, processing the first data representation into a predictive model, and comparing the data representation with the predictive model.

24 Claims, 6 Drawing Sheets

(56) References Cited

U.S. PATENT DOCUMENTS

| | | | |
|---|---|---|---|
| 5,058,179 A | 10/1991 | Denker et al. | |
| 5,450,523 A | 9/1995 | Zhao | |
| 5,774,059 A | 6/1998 | Henry et al. | |
| 5,867,802 A | 2/1999 | Borza | |
| 6,152,563 A | 11/2000 | Hutchinson et al. | |
| 6,274,745 B1 | 8/2001 | Inanaga et al. | |
| 6,628,813 B2 | 9/2003 | Scott et al. | |
| 6,633,090 B2 | 10/2003 | Harter et al. | |
| 6,873,714 B2 | 3/2005 | Witt et al. | |
| 6,923,370 B2 | 8/2005 | Gotfried et al. | |
| 6,956,608 B1 | 10/2005 | Shapiro et al. | |
| 6,992,562 B2 | 1/2006 | Fuks et al. | |
| 7,158,097 B2 | 1/2007 | Taylor et al. | |
| 7,218,761 B2 | 5/2007 | McClurg et al. | |
| 7,317,815 B2 * | 1/2008 | Steinberg | G06K 9/00 382/199 |
| 7,346,195 B2 | 3/2008 | Lauper et al. | |
| 7,630,524 B2 | 12/2009 | Lauper et al. | |
| 7,660,442 B2 | 2/2010 | Sweeney et al. | |
| 7,986,816 B1 | 7/2011 | Hoanca et al. | |
| 8,026,840 B2 | 9/2011 | Dwelly et al. | |
| 8,064,645 B1 | 11/2011 | Sezille | |
| 8,160,307 B2 | 4/2012 | Polcha et al. | |
| 8,194,938 B2 | 6/2012 | Wechsler et al. | |
| 8,235,529 B1 | 8/2012 | Raffle et al. | |
| 8,290,220 B2 | 10/2012 | Uchida | |
| 8,396,265 B1 * | 3/2013 | Ross | G06V 40/40 382/103 |
| 8,437,513 B1 | 5/2013 | Derakhshani et al. | |
| 8,472,681 B2 | 6/2013 | Hamza | |
| 8,506,080 B2 | 8/2013 | Raffle et al. | |
| 8,542,879 B1 * | 9/2013 | Nechyba | G06V 40/45 382/118 |
| 8,638,939 B1 | 1/2014 | Casey et al. | |
| 8,856,541 B1 | 10/2014 | Chaudhury et al. | |
| 8,939,584 B2 | 1/2015 | Raffle et al. | |
| 8,965,287 B2 | 2/2015 | Lam | |
| 9,002,586 B2 | 4/2015 | Feit | |
| 9,003,196 B2 | 4/2015 | Hoyos et al. | |
| 9,042,609 B2 | 5/2015 | Todoroki | |
| 9,053,545 B2 * | 6/2015 | Steinberg | H04N 5/23219 |
| 9,081,947 B2 | 7/2015 | Dewan et al. | |
| 9,104,921 B2 | 8/2015 | Derakhshani et al. | |
| 9,111,402 B1 | 8/2015 | Krishnan et al. | |
| 9,244,529 B2 | 1/2016 | Model | |
| 9,355,612 B1 | 5/2016 | Shepard et al. | |
| D763,872 S | 8/2016 | Tussy | |
| 9,519,769 B2 | 12/2016 | Azar et al. | |
| 9,641,523 B2 | 5/2017 | Langley et al. | |
| 9,652,663 B2 | 5/2017 | Lau et al. | |
| D813,264 S | 3/2018 | Tussy | |
| 9,913,135 B2 | 3/2018 | Perold et al. | |
| 9,953,149 B2 | 4/2018 | Tussy | |
| 9,965,728 B2 | 5/2018 | Perold | |
| 9,971,920 B2 | 5/2018 | Derakhshani et al. | |
| 10,063,560 B2 | 8/2018 | Gordon et al. | |
| 10,094,655 B2 * | 10/2018 | Sabitov | G01B 11/14 |
| 10,102,358 B2 | 10/2018 | Wilder | |
| 10,135,815 B2 | 11/2018 | Lecun et al. | |
| 10,192,109 B2 | 1/2019 | Skogo et al. | |
| 10,410,076 B2 | 9/2019 | Van et al. | |
| 10,482,230 B2 | 11/2019 | Wilder | |
| 10,515,262 B2 | 12/2019 | Morishita | |
| 10,528,849 B2 | 1/2020 | Fan et al. | |
| 10,733,275 B1 | 8/2020 | Knas et al. | |
| 10,735,959 B2 | 8/2020 | Lecun et al. | |
| 2003/0091215 A1 | 5/2003 | Lauper et al. | |
| 2003/0156742 A1 | 8/2003 | Witt et al. | |
| 2004/0017934 A1 | 1/2004 | Kocher | |
| 2004/0075645 A1 | 4/2004 | Taylor et al. | |
| 2005/0117784 A1 | 6/2005 | Merbach et al. | |
| 2006/0120568 A1 | 6/2006 | McConville et al. | |
| 2006/0294393 A1 | 12/2006 | Mc | |
| 2007/0113099 A1 * | 5/2007 | Takikawa | G06V 40/16 713/186 |
| 2008/0000286 A1 | 1/2008 | Strohmaier et al. | |
| 2008/0002860 A1 | 1/2008 | Super et al. | |
| 2008/0056539 A1 | 3/2008 | Sweeney et al. | |
| 2008/0091952 A1 | 4/2008 | Sumner et al. | |
| 2008/0137916 A1 | 6/2008 | Lauper et al. | |
| 2008/0263681 A1 | 10/2008 | Dooms et al. | |
| 2008/0284726 A1 | 11/2008 | Boillot | |
| 2008/0296364 A1 | 12/2008 | Pappas et al. | |
| 2009/0001160 A1 | 1/2009 | Davis et al. | |
| 2009/0092294 A1 | 4/2009 | Uchida | |
| 2009/0175506 A1 | 7/2009 | Polcha et al. | |
| 2009/0185726 A1 | 7/2009 | Higuchi | |
| 2009/0202114 A1 * | 8/2009 | Morin | G06T 7/246 382/118 |
| 2009/0249478 A1 | 10/2009 | Rosener et al. | |
| 2009/0297032 A1 | 12/2009 | Loui et al. | |
| 2010/0030698 A1 | 2/2010 | Goodin | |
| 2010/0042940 A1 | 2/2010 | Monday et al. | |
| 2010/0046830 A1 | 2/2010 | Wang et al. | |
| 2010/0127827 A1 | 5/2010 | Watanabe | |
| 2010/0128936 A1 | 5/2010 | Baughman | |
| 2010/0148923 A1 | 6/2010 | Takizawa | |
| 2010/0191551 A1 | 7/2010 | Drance et al. | |
| 2010/0246902 A1 | 9/2010 | Rowe et al. | |
| 2010/0316263 A1 | 12/2010 | Hamza | |
| 2011/0119734 A1 | 5/2011 | Crawford et al. | |
| 2011/0135166 A1 | 6/2011 | Wechsler et al. | |
| 2011/0229045 A1 | 9/2011 | Yu | |
| 2011/0254942 A1 | 10/2011 | Suzuki | |
| 2011/0270712 A1 | 11/2011 | Wood et al. | |
| 2011/0317872 A1 | 12/2011 | Free | |
| 2012/0046862 A1 | 2/2012 | Griffin et al. | |
| 2012/0128936 A1 | 5/2012 | Imajima et al. | |
| 2012/0137137 A1 | 5/2012 | Brickell et al. | |
| 2012/0162385 A1 | 6/2012 | Park et al. | |
| 2012/0218936 A1 | 8/2012 | Fleeman et al. | |
| 2012/0288166 A1 | 11/2012 | Sun et al. | |
| 2013/0015946 A1 * | 1/2013 | Lau | G06V 10/422 340/5.2 |
| 2013/0099892 A1 | 4/2013 | Tucker et al. | |
| 2013/0135204 A1 | 5/2013 | Raffle et al. | |
| 2013/0222835 A1 | 8/2013 | Iwamoto et al. | |
| 2013/0227651 A1 | 8/2013 | Schultz et al. | |
| 2013/0268418 A1 | 10/2013 | Sardi et al. | |
| 2013/0275309 A1 | 10/2013 | Kwong | |
| 2013/0286161 A1 | 10/2013 | Lv et al. | |
| 2013/0290154 A1 | 10/2013 | Cherry et al. | |
| 2013/0294642 A1 | 11/2013 | Wang et al. | |
| 2013/0300652 A1 | 11/2013 | Raffle et al. | |
| 2013/0311866 A1 | 11/2013 | Herold | |
| 2013/0342672 A1 | 12/2013 | Gray et al. | |
| 2014/0013252 A1 | 1/2014 | Ehrler et al. | |
| 2014/0037134 A1 | 2/2014 | Tong et al. | |
| 2014/0068740 A1 | 3/2014 | Lecun et al. | |
| 2014/0072185 A1 | 3/2014 | Dunlap et al. | |
| 2014/0165187 A1 | 6/2014 | Daesung et al. | |
| 2014/0195974 A1 | 7/2014 | Ballard et al. | |
| 2014/0211995 A1 | 7/2014 | Model | |
| 2014/0294257 A1 | 10/2014 | Tussy | |
| 2014/0351163 A1 | 11/2014 | Tussy | |
| 2014/0366113 A1 | 12/2014 | Lecun et al. | |
| 2015/0010145 A1 | 1/2015 | Iwashita et al. | |
| 2015/0039892 A1 | 2/2015 | Fujita et al. | |
| 2015/0055841 A1 | 2/2015 | Xiao et al. | |
| 2015/0193666 A1 | 7/2015 | Derakhshani et al. | |
| 2015/0227735 A1 | 8/2015 | Chappell | |
| 2015/0227780 A1 | 8/2015 | Tussy | |
| 2015/0256740 A1 | 9/2015 | Kalama | |
| 2015/0310259 A1 | 10/2015 | Lau et al. | |
| 2015/0334562 A1 | 11/2015 | Perold et al. | |
| 2015/0334567 A1 * | 11/2015 | Chen | G06V 40/172 455/411 |
| 2015/0347833 A1 | 12/2015 | Robinson et al. | |
| 2015/0348214 A1 | 12/2015 | Jain | |
| 2015/0350225 A1 | 12/2015 | Perold et al. | |
| 2016/0044029 A1 | 2/2016 | Langley et al. | |
| 2016/0062456 A1 | 3/2016 | Wang et al. | |
| 2016/0063235 A1 * | 3/2016 | Tussy | G06V 40/166 726/6 |

(56) References Cited

U.S. PATENT DOCUMENTS

| | | | |
|---|---|---|---|
| 2016/0063314 A1* | 3/2016 | Samet | G06F 21/44 348/78 |
| 2016/0132735 A1 | 5/2016 | Derakhshani et al. | |
| 2016/0182506 A1 | 6/2016 | Hoyos | |
| 2016/0283710 A1 | 9/2016 | Kwon et al. | |
| 2016/0307038 A1 | 10/2016 | Skogo et al. | |
| 2016/0335483 A1 | 11/2016 | Pfursich et al. | |
| 2016/0371555 A1 | 12/2016 | Derakhshani et al. | |
| 2017/0053175 A1 | 2/2017 | Tussy | |
| 2017/0061251 A1 | 3/2017 | Fan et al. | |
| 2017/0064062 A1 | 3/2017 | Lee et al. | |
| 2017/0109513 A1 | 4/2017 | Skogo et al. | |
| 2017/0124385 A1* | 5/2017 | Ganong | G06V 40/172 |
| 2017/0185760 A1 | 6/2017 | Wilder | |
| 2017/0186170 A1 | 6/2017 | Nugraha et al. | |
| 2017/0193285 A1 | 7/2017 | Negi et al. | |
| 2017/0228586 A1 | 8/2017 | Morishita | |
| 2017/0304732 A1 | 10/2017 | Velio et al. | |
| 2017/0318019 A1 | 11/2017 | Gordon et al. | |
| 2017/0351929 A1 | 12/2017 | Kim | |
| 2018/0012070 A1 | 1/2018 | Shin et al. | |
| 2018/0068173 A1* | 3/2018 | Kolleri | G06V 40/172 |
| 2018/0181737 A1* | 6/2018 | Tussy | G06V 40/20 |
| 2018/0189960 A1 | 7/2018 | Martin | |
| 2018/0196930 A1 | 7/2018 | Ahuja et al. | |
| 2018/0218139 A1 | 8/2018 | Tussy | |
| 2018/0253152 A1 | 9/2018 | Forsblom et al. | |
| 2018/0260643 A1 | 9/2018 | Sheikh Faridul et al. | |
| 2019/0005222 A1 | 1/2019 | Wilder | |
| 2019/0080072 A1* | 3/2019 | Van Os | H04L 9/3231 |
| 2019/0102608 A1* | 4/2019 | Wang | H04N 5/2354 |
| 2019/0213311 A1* | 7/2019 | Tussy | G06V 10/17 |
| 2019/0213312 A1* | 7/2019 | Tussy | G06V 40/40 |
| 2019/0303551 A1 | 10/2019 | Tussy | |
| 2019/0311102 A1 | 10/2019 | Tussy | |
| 2020/0042685 A1* | 2/2020 | Tussy | G06V 10/17 |
| 2020/0309930 A1* | 10/2020 | Zhou | G06V 40/172 |
| 2020/0320282 A1* | 10/2020 | Boic | G06V 40/174 |
| 2021/0182553 A1 | 6/2021 | Lv et al. | |
| 2021/0334570 A1* | 10/2021 | Hamid | G06F 21/32 |

FOREIGN PATENT DOCUMENTS

| | | |
|---|---|---|
| CN | 102426715 A | 4/2012 |
| CN | 105389491 A | 3/2016 |
| EP | 0049039 A1 | 4/1982 |
| EP | 0049039 B1 | 7/1984 |
| EP | 2192526 A2 | 6/2010 |
| EP | 2993619 A1 | 3/2016 |
| JP | H10177650 A | 6/1998 |
| JP | 2002032343 A | 1/2002 |
| JP | 2002207705 A | 7/2002 |
| JP | 2002259345 A | 9/2002 |
| JP | 2003148017 A | 5/2003 |
| JP | 2003178306 A | 6/2003 |
| JP | 2006259923 A | 9/2006 |
| JP | 2008242631 A | 10/2008 |
| JP | 2009017516 A | 1/2009 |
| JP | 2010128822 A | 6/2010 |
| JP | 2010146502 A | 7/2010 |
| JP | 2010177650 A | 8/2010 |
| JP | 2016051482 A | 4/2016 |
| JP | 2018200716 A | 12/2018 |
| KR | 20160026791 A | 3/2016 |
| TW | 201327413 A | 7/2013 |
| TW | 201814572 A | 4/2018 |
| TW | I664552 B | 7/2019 |
| WO | WO-0188857 A1 | 11/2001 |
| WO | WO-2004072899 A1 | 8/2004 |
| WO | WO-2007000504 A1 | 1/2007 |
| WO | WO-2007099834 A1 | 9/2007 |
| WO | WO-2009013526 A1 | 1/2009 |
| WO | WO-2012020591 A1 | 2/2012 |
| WO | WO-2013081673 A1 | 6/2013 |
| WO | WO-2014004584 A2 | 1/2014 |
| WO | WO-2014039732 A2 | 3/2014 |
| WO | WO-2014184436 A1 | 11/2014 |
| WO | WO-2015175670 A1 | 11/2015 |
| WO | WO-2015187882 A1 | 12/2015 |
| WO | WO-2016059786 A1 | 4/2016 |
| WO | WO-2016168814 A1 | 10/2016 |
| WO | WO-2017189935 A1 | 11/2017 |
| WO | WO-2018125563 A1 | 7/2018 |
| WO | WO-2019151368 A1 | 8/2019 |
| WO | WO-2020185948 A1 | 9/2020 |
| WO | WO-2021126825 A1 | 6/2021 |

OTHER PUBLICATIONS

PCT/US2020/065070 International Search Report and Written Opinion dated Mar. 19, 2021.
Smith et al., Face recognition on consumer devices: reflections on replay attacks. IEE Transactions on Information Forensics and Security 10(4):736-745 (2015).
U.S. Appl. No. 16/893,279 Office Action dated Aug. 3, 2021.
Boult et al.: Revocable fingerprint biotokens: Accuracy and security analysis. 2007 IEEE Conference on Computer Vision and Pattern Recognition, 2007, 8 pages.
Boureau et al. A theoretical analysis of feature pooling in visual recognition. Proceedings of the 27th International Conference on Machine Learning. 2010; 111-118.
Cortes et al.: Support-vector networks. Machine Learning. 1995; 20:273-297.
Dalal et al.: Histograms of oriented gradients for human detection. Proceedings of the 2005 IEEE Computer Society Conference on Computer Vision and Pattern Recognition. 2005; 1:886-893.
Han et al.: Palmprint recognition based on directional features and graph matching. Advances in Biometrics: ICB 2007, 4642:1164-1173, 2007.
International Application No. PCT/US2018/051559 International Search Report and Written Opinion dated Nov. 30, 2018.
Lecun et al.: Convolutional networks and applications in vision. Proceedings of IEEE International Symposium on Circuits and Systems. 2010; 253-256.
Lecun et al.: Gradient-based learning applied to document recognition. Proceedings of the IEEE. Nov. 1998; 86(11):2278-2324.
Lowe, D.: Distinctive image features from scale-invariant keypoints. International Journal of Computer Vision. 2004; 60(2):91-110.
"Media filter." From Wikipedia, the free encyclopedia. Downloaded from the internet https://en.wikipedia.org/w/index.php?title=Median_filter&olded=489380290. Downloaded on Mar. 10, 2016, 4 pages.
PCT/US2013/058343 International Preliminary Report on Patentability dated Mar. 19, 2015.
PCT/US2013/058343 International search report dated Mar. 13, 2014.
PCT/US2015/030586 International Preliminary Report on Patentability dated Nov. 24, 2016.
PCT/US2015/030586 International Search Report and Written Opinion dated Aug. 20, 2015.
PCT/US2015/034077 International Preliminary Report on Patentability dated Dec. 15, 2016.
PCT/US2015/034077 International Search Report and Written Opinion dated Sep. 30, 2015.
PCT/US2018/051559 International Preliminary Report on Patentability dated Mar. 24, 2020.
PCT/US2018/051559 International Search Report and Written Opinion dated Nov. 30, 2018.
Rokita et al.: Cell Phones Personal Authentication Systems Using Multimodal Biometrics. ICIAR:25-27 (2008).
Sermanet et al.: Pedestrian detection with unsupervised multi-stage feature learning. Proceedings of the IEEE Conference on Computer Vision and Pattern Recognition. Jun. 2013; 3626-3633.
U.S. Appl. No. 14/019,512 Office Action dated Nov. 6, 2014.
U.S. Appl. No. 14/449,730 Final Office Action dated Apr. 30, 2015.
U.S. Appl. No. 14/449,730 Office Action dated Nov. 18, 2014.
U.S. Appl. No. 14/449,730 Office Action dated Mar. 31, 2016.

(56) References Cited

OTHER PUBLICATIONS

U.S. Appl. No. 14/449,730 Office Action dated May 30, 2017.
U.S. Appl. No. 14/449,730 Office Action dated Oct. 18, 2017.
U.S. Appl. No. 14/449,730 Office Action dated Sep. 14, 2016.
U.S. Appl. No. 14/711,664 Office Action dated Apr. 7, 2017.
U.S. Appl. No. 14/711,664 Office Action dated Sep. 30, 2016.
U.S. Appl. No. 14/730,166 Office Action dated Feb. 28, 2017.
U.S. Appl. No. 14/730,166 Office Action dated Jul. 13, 2017.
U.S. Appl. No. 14/730,166 Office Action dated Sep. 29, 2016.
U.S. Appl. No. 16/134,781 Office Action dated Mar. 21, 2019.
U.S. Appl. No. 16/153,412 Office Action dated Nov. 18, 2019.
Viola et al., Rapid object detection using a boosted cascade of simple features. Proceedings of the 2001 IEEE Computer Society Conference on Computer Vision and Pattern Recognition. 2001; 1:I-511-I-518.
U.S. Appl. No. 17/121,587 Office Action dated Jan. 5, 2022.
Japanese Patent Application No. 2020-515984 First Office Action dated Feb. 6, 2022.

* cited by examiner

METHODS AND SYSTEMS FOR DETECTING
SPOOFING OF FACIAL RECOGNITION IN
CONNECTION WITH MOBILE DEVICES

CROSS-REFERENCE

This application claims the benefit of U.S. Provisional Application No. 62/817,554, filed Mar. 12, 2019, which application is incorporated herein by reference in its entirety.

BACKGROUND

"Spoofing" a security system is generally defined as an act of masquerading as an authenticated user, by submitting false data. In this case, methods of liveness detection may be employed to determine whether a biometric modality, such as a face, a palm (palm print), a finger (fingerprint), or an ear, carries the unique structural qualities of the original three-dimensional biometric modality, or is a two-dimensional replicate.

SUMMARY

In one aspect, disclosed herein are computer-implemented methods for detecting spoofing of biometric identity recognition using the camera of a mobile device, the method comprising: (a) recording, by a camera, a user's face image or set of images at a first distance; (b) processing the user's face image or set of images at the first distance with algorithms to generate a first data representation of the user's image or set of images; (c) processing the first data representation into a predictive model that estimates the data representations of the user's face image or set of images at other distances or orientations between the user's face and the camera; (d) changing the distance between the user's face and the camera, wherein changing the distance comprises increasing the distance between the user's face and the camera, decreasing the distance between the user's face and the camera, changing the orientation of the camera in relation to the user's face, changing the orientation of the user's face in relation to the camera, or any combination thereof; (e) recording, by the camera, the user's face image or set of images at a second distance; (f) processing the user's face image or set of images at the second distance with algorithms to generate a second data representation of the user's second image or set of images; (g) comparing the second data representation with the predictive model generated from the first data representation to determine if they match; and (h) validating an identity recognition match if the second data representation matches the predictive model generated from the first data representation. In some embodiments, the method further comprises rejecting the identity recognition match if, after comparing the second data representation with the predictive model generated from the first data representation, the second data representation does not match the predictive model generated from the first data representation. In some embodiments, the method further comprises validating an additional data representation identity recognition match if the one or more additional data representations match the predictive model generated from the first data representation. In some embodiments, the method further comprises rejecting an additional data representation identity recognition match if the one or more additional data representations does not match the predictive model generated from the first data representation. In some embodiments, the method further comprises comparing additional data to determine if the user presenting the face image or set of images at the first distance is a match to the user presenting the face image or set of images at the second distance if the second data representation does not match the predictive model generated from the first data representation. In some embodiments, additional data comprises a name, password, identity number, address, geo-location, device ID, unique data characteristic of the user's software environment on the mobile device, other biometric data, predictive models of user data or biometric data, other data, or any combination thereof. In some embodiments, the method further comprising: (a) processing the second data representation into a predictive model that estimates the data representations of the user's face image or set of images at other distances or orientations between the user's face and the camera; (b) comparing the first data representation with the predictive model generated from the second data representation to determine if they match; and (c) validating an identity recognition match if the first data representation matches the predictive model generated from the second data representation. In some embodiments, the comparison of a predictive model to a data representation comprises configuring a matching architecture. In some embodiments, the comparison of a predictive model to a data representation comprises comparing a predictive model generated from a first data representation with a second data representation, comparing a predictive model generated from a second data representation with a first data representation, or any combination thereof. In some embodiments, the configuration of matching architecture changes upon successive matching exercises, or changes upon certain successive matching exercise and not others, wherein changes may be randomized between matching exercises, or be based on non-randomized determinate data or protocols, or which may not change. In some embodiments, changes to the configuration of matching architecture are based on changes being randomized between matching exercises, changes being based on non-randomized determinate data or protocols, or any combination thereof. In some embodiments, the configuration of matching architecture does not change. In some embodiments, a guided user interface is used to capture the first and/or second data representations. In some embodiments, information captured from the guided user interface is used in matching exercises. In some embodiments, the method further comprises: (a) recording, from one or more sensors on the mobile device, motion and/or location data at the time the user's face image or set of images is recorded by the camera at the first distance; (b) recording, from one or more sensors on the mobile device, motion and/or location data at the time the user's face image or set of images is recorded by the camera at the second distance; (c) comparing the motion and/or location data recorded at the first distance and motion and/or location data from the second distance with the predictive model generated from the first data representation, and the second data representation; and (d) validating an identity recognition match if (I) the second data representation matches the predictive model generated from the first data representation predictive modeling; and (II) the motion and/or location data match the expected motion and/or location data attributing to the position of the mobile device to the user's face. In some embodiments, the motion and/or location data is recorded continuously or at a plurality of intervals between the time of recording of the first data representation and the time of recording of the second data representation. In some embodiments, the method further comprising comparing (I) the motion and/or location data is recorded continuously or at a plurality of intervals between the time of recording of the first data representation and the time of recording of the second data representation with (II) the predictive model generated from the first data representation, and the second data representation. In some embodiments, the method further comprising validating an identity recognition match if (I) the second data representation matches the predictive model generated from the first data representation; and (II) the motion and/or location data recorded continuously or at a plurality of intervals match the expected motion and/or location data attributing to the position of the mobile device to the user's face. In some embodiments, the method further comprising (a) recording, from one or more sensors on the mobile device, motion and/or location data at the time the user's face image or set of images is recorded by the camera at the first distance; (b) recording, from one or more sensors on the mobile device, motion and/or location data at the time the user's face image or set of images is recorded by the camera at the second distance; (c) comparing the motion and/or location data recorded at the first distance and motion and/or location data from the second distance with the predictive model generated from the second data representation, and the first data representation; and; and (d) validating an identity recognition match if (I) the first data representation matches the predictive model generated from the second data representation predictive modeling; and (II) the motion and/or location data match the expected motion and/or location data attributing to the position of the mobile device to the user's face. In some embodiments, the motion and/or location data is recorded continuously or at a plurality of intervals between the time of recording of the first data representation and the time of recording of the second data representation. In some embodiments, the method further comprises comparing the (I) the motion and/or location data is recorded continuously or at a plurality of intervals between the time of recording of the first data representation and the time of recording of the second data representation with (II) the predictive model generated from the second data representation, and the first data representation. In some embodiments, the method further comprises validating an identity recognition match if (I) the first data representation matches the predictive model generated from the second data representation; and (II) the motion and/or location data recorded continuously or at a plurality of intervals match the expected motion and/or location data attributing to the position of the mobile device to the user's face.

In another aspect, disclosed herein are computer-implemented systems comprising a computing device comprising at least one processor, an operating system configured to perform executable instructions, a memory, and a computer program including instructions executable by the computing device to create an application for detecting spoofing of biometric identity recognition using the camera of a mobile device, the application comprising: (a) a software module configured to record a user's face image or set of images at a first distance; (b) a software module configured to process the user's face image or set of images at the first distance with algorithms to generate a first data representation of the user's image or set of images; (c) a software module configured to process the first data representation into a predictive model that estimates the data representations of the user's face image or set of images at other distances or orientations between the user's face and the camera; (d) a software module configured to change the distance between the user's face and the camera, wherein changing the distance comprises increasing the distance between the user's face and the camera, decreasing the distance between the user's face and the camera, changing the orientation of the camera in relation to the user's face, changing the orientation of the user's face in relation to the camera, or any combination thereof; (e) a software module configured to record the user's face image or set of images at a second distance; (f) a software module configured to process the user's face image or set of images at the second distance with algorithms to generate a second data representation of the user's second image or set of images; (g) a software module configured to compare the second data representation with the predictive model generated from the first data representation to determine if they match; and (h) a software module configured to validate an identity recognition match if the second data representation matches the predictive model generated from the first data representation. In some embodiments, the system further comprises a software module configured to reject the identity recognition match if, after the software module configured to compare the second data representation with the predictive model generated from the first data representation, the second data representation does not match the predictive model generated from the first data representation. In some embodiments, the system further comprising a software module configured to capture one or more additional data representations from the user's face image or set of images from the first or second distance, and compare the captured one or more additional data representations with the predictive model generated from the first data representation to determine if they match if, after comparing the second data representation with the predictive model generated from the first data representation, the second data representation does not match the predictive model generated from the first data representation. In some embodiments, the system further comprising a software module configured to validate an additional data representation identity recognition match if the one or more additional data representations match the predictive model generated from the first data representation. In some embodiments, the system further comprising a software module configured to reject an additional data representation identity recognition match if the one or more additional data representations does not match the predictive model generated from the first data representation. In some embodiments, the system further comprising a software module configured to compare additional data to determine if the user presenting the face image or set of images at the first distance is a match to the user presenting the face image or set of images at the second distance if the second data representation does not match the predictive model generated from the first data representation. In some embodiments, additional data comprises a name, password, identity number, address, geo-location, device ID, unique data characteristic of the user's software environment on the mobile device, other biometric data, predictive models of user data or biometric data, other data, or any combination thereof. In some embodiments, the system further comprises: (a) a software module configured to process the second data representation into a predictive model that estimates the data representations of the user's face image or set of images at other distances or orientations between the user's face and the camera; (b) a software module configured to compare the first data representation with the predictive model generated from the second data representation to determine if they match; and (c) a software module configured to validate an identity recognition match if the first data representation matches the predictive model generated from the second data representation. In some embodiments, the software module configured to compare the first data representation with the predictive model generated from the second data representation comprises a matching architecture configuration. In some embodiments, any software module configured to compare a predictive model to a data representation comprises comparing a predictive model generated from a first data representation with a second data representation, comparing a predictive model generated from a second data representation with a first data representation, or any combination thereof. In some embodiments, the configuration of matching architecture changes upon successive matching exercises, or changes upon certain successive matching exercise and not others, wherein changes may be randomized between matching exercises, or be based on non-randomized determinate data or protocols, or which may not change. In some embodiments, changes to the configuration of matching architecture are based on changes being randomized between matching exercises, changes being based on non-randomized determinate data or protocols, or any combination thereof. In some embodiments, the matching architecture configuration does not change. In some embodiments, the system further comprises a guided user interface used to capture the first and/or second data representations. In some embodiments, information captured from the guided user interface is used in matching exercises. In some embodiments, the system further comprises: (a) a software module configured to record, from one or more sensors on the mobile device, motion and/or location data at the time the user's face image or set of images is recorded by the camera at the first distance; (b) a software module configured to record, from one or more sensors on the mobile device, motion and/or location data at the time the user's face image or set of images is recorded by the camera at the second distance; (c) a software module configured to compare the motion and/or location data recorded at the first distance and motion and/or location data from the second distance with the predictive model generated from the first data representation, and the second data representation; and (d) a software module configured to validate an identity recognition match if (I) the second data representation matches the predictive model generated from the first data representation predictive modeling; and (II) the motion and/or location data match the expected motion and/or location data attributing to the position of the mobile device to the user's face. In some embodiments, the motion and/or location data is recorded continuously or at a plurality of intervals between the time of recording of the first data representation and the time of recording of the second data representation. In some embodiments, the system further comprising a software module configured to compare (I) the motion and/or location data is recorded continuously or at a plurality of intervals between the time of recording of the first data representation and the time of recording of the second data representation with (II) the predictive model generated from the first data representation, and the second data representation. In some embodiments, the system further comprising a software module configured to validate an identity recognition match if (I) the second data representation matches the predictive model generated from the first data representation; and (II) the motion and/or location data recorded continuously or at a plurality of intervals match the expected motion and/or location data attributing to the position of the mobile device to the user's face. In some embodiments, the system further comprising: (a) a software module configured to record, from one or more sensors on the mobile device, motion and/or location data at the time the user's face image or set of images is recorded by the camera at the first distance; (b) a software module configured to record, from one or more sensors on the mobile device, motion and/or location data at the time the user's face image or set of images is recorded by the camera at the second distance; (c) a software module configured to compare the motion and/or location data recorded at the first distance and motion and/or location data from the second distance with the predictive model generated from the second data representation, and the first data representation; and (d) a software module configured to validate an identity recognition match if (I) the first data representation matches the predictive model generated from the second data representation predictive modeling; and (II) the motion and/or location data match the expected motion and/or location data attributing to the position of the mobile device to the user's face. In some embodiments, the motion and/or location data is recorded continuously or at a plurality of intervals between the time of recording of the first data representation and the time of recording of the second data representation. In some embodiments, the system further comprising a software module configured to compare the (I) the motion and/or location data is recorded continuously or at a plurality of intervals between the time of recording of the first data representation and the time of recording of the second data representation with (II) the predictive model generated from the second data representation, and the first data representation. In some embodiments, the system further comprising a software module configured to validate an identity recognition match if (I) the first data representation matches the predictive model generated from the second data representation; and (II) the motion and/or location data recorded continuously or at a plurality of intervals match the expected motion and/or location data attributing to the position of the mobile device to the user's face.

In yet another aspect, disclosed herein are non-transitory computer-readable storage media encoded with a computer program including instructions executable by one or more processors to create an application for detecting spoofing of biometric identity recognition using the camera of a mobile device, the application comprising: (a) a software module configured to record a user's face image or set of images at a first distance; (b) a software module configured to process the user's face image or set of images at the first distance with algorithms to generate a first data representation of the user's image or set of images; (c) a software module configured to process the first data representation into a predictive model that estimates the data representations of the user's face image or set of images at other distances or orientations between the user's face and the camera; (d) a software module configured to change the distance between the user's face and the camera, wherein changing the distance comprises increasing the distance between the user's face and the camera, decreasing the distance between the user's face and the camera, changing the orientation of the camera in relation to the user's face, changing the orientation of the user's face in relation to the camera, or any combination thereof; (e) a software module configured to record the user's face image or set of images at a second distance; (f) a software module configured to process the user's face image or set of images at the second distance with algorithms to generate a second data representation of the user's second image or set of images; (g) a software module configured to compare the second data representation with the predictive model generated from the first data representation to determine if they match; and (h) a software module configured to validate an identity recognition match if the second data representation matches the predictive model generated from the first data representation. In some embodiments, the media further comprises a software module configured to reject the identity recognition match if, after the software module configured to compare the second data representation with the predictive model generated from the first data representation, the second data representation does not match the predictive model generated from the first data representation. In some embodiments, the media further comprising a software module configured to capture one or more additional data representations from the user's face image or set of images from the first or second distance, and compare the captured one or more additional data representations with the predictive model generated from the first data representation to determine if they match if, after comparing the second data representation with the predictive model generated from the first data representation, the second data representation does not match the predictive model generated from the first data representation. In some embodiments, the media further comprising a software module configured to validate an additional data representation identity recognition match if the one or more additional data representations match the predictive model generated from the first data representation. In some embodiments, the media further comprising a software module configured to reject an additional data representation identity recognition match if the one or more additional data representations does not match the predictive model generated from the first data representation. In some embodiments, the media further comprising a software module configured to compare additional data to determine if the user presenting the face image or set of images at the first distance is a match to the user presenting the face image or set of images at the second distance if the second data representation does not match the predictive model generated from the first data representation. In some embodiments, additional data comprises a name, password, identity number, address, geo-location, device ID, unique data characteristic of the user's software environment on the mobile device, other biometric data, predictive models of user data or biometric data, other data, or any combination thereof. In some embodiments, the media further comprises: (a) a software module configured to process the second data representation into a predictive model that estimates the data representations of the user's face image or set of images at other distances or orientations between the user's face and the camera; (b) a software module configured to compare the first data representation with the predictive model generated from the second data representation to determine if they match; and (c) a software module configured to validate an identity recognition match if the first data representation matches the predictive model generated from the second data representation. In some embodiments, the software module configured to compare the first data representation with the predictive model generated from the second data representation comprises a matching architecture configuration. In some embodiments, a software module configured to compare a predictive model to a data representation comprises comparing a predictive model generated from a first data representation with a second data representation, comparing a predictive model generated from a second data representation with a first data representation, or any combination thereof. In some embodiments, the configuration of matching architecture changes upon successive matching exercises, or changes upon certain successive matching exercise and not others, wherein changes may be randomized between matching exercises, or be based on non-randomized determinate data or protocols, or which may not change. In some embodiments, changes to the configuration of matching architecture are based on changes being randomized between matching exercises, changes being based on non-randomized determinate data or protocols, or any combination thereof. In some embodiments, the configuration of matching architecture does not change. In some embodiments, the media further comprises a guided user interface used to capture the first and/or second data representations. In some embodiments, information captured from the guided user interface is used in matching exercises. In some embodiments, the media further comprising: (a) a software module configured to record, from one or more sensors on the mobile device, motion and/or location data at the time the user's face image or set of images is recorded by the camera at the first distance; (b) a software module configured to record, from one or more sensors on the mobile device, motion and/or location data at the time the user's face image or set of images is recorded by the camera at the second distance; (c) a software module configured to compare the motion and/or location data recorded at the first distance and motion and/or location data from the second distance with the predictive model generated from the first data representation, and the second data representation; and (d) a software module configured to validate an identity recognition match if (I) the second data representation matches the predictive model generated from the first data representation predictive modeling; and (II) the motion and/or location data match the expected motion and/or location data attributing to the position of the mobile device to the user's face. In some embodiments, the motion and/or location data is recorded continuously or at a plurality of intervals between the time of recording of the first data representation and the time of recording of the second data representation. In some embodiments, the media further comprising a software module configured to compare (I) the motion and/or location data is recorded continuously or at a plurality of intervals between the time of recording of the first data representation and the time of recording of the second data representation with (II) the predictive model generated from the first data representation, and the second data representation. In some embodiments, the media further comprising a software module configured to validate an identity recognition match if (I) the second data representation matches the predictive model generated from the first data representation; and (II) the motion and/or location data recorded continuously or at a plurality of intervals match the expected motion and/or location data attributing to the position of the mobile device to the user's face. In some embodiments, the media further comprising: (a) a software module configured to record, from one or more sensors on the mobile device, motion and/or location data at the time the user's face image or set of images is recorded by the camera at the first distance; (b) a software module configured to record, from one or more sensors on the mobile device, motion and/or location data at the time the user's face image or set of images is recorded by the camera at the second distance; (c) a software module configured to compare the motion and/or location data recorded at the first distance and motion and/or location data from the second distance with the predictive model generated from the second data representation, and the first data representation; and (d) a software module configured to validate an identity recognition match if (I) the first data representation matches the predictive model generated from the second data representation predictive modeling; and (II) the motion and/or location data match the expected motion and/or location data attributing to the position of the mobile device to the user's face. In some embodiments, the motion and/or location data is recorded continuously or at a plurality of intervals between the time of recording of the first data representation and the time of recording of the second data representation. In some embodiments, the media further comprising a software module configured to compare the (I) the motion and/or location data is recorded continuously or at a plurality of intervals between the time of recording of the first data representation and the time of recording of the second data representation with (II) the predictive model generated from the second data representation, and the first data representation. In some embodiments, the media further comprising a software module configured to validate an identity recognition match if (I) the first data representation matches the predictive model generated from the second data representation; and (II) the motion and/or location data recorded continuously or at a plurality of intervals match the expected motion and/or location data attributing to the position of the mobile device to the user's face.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
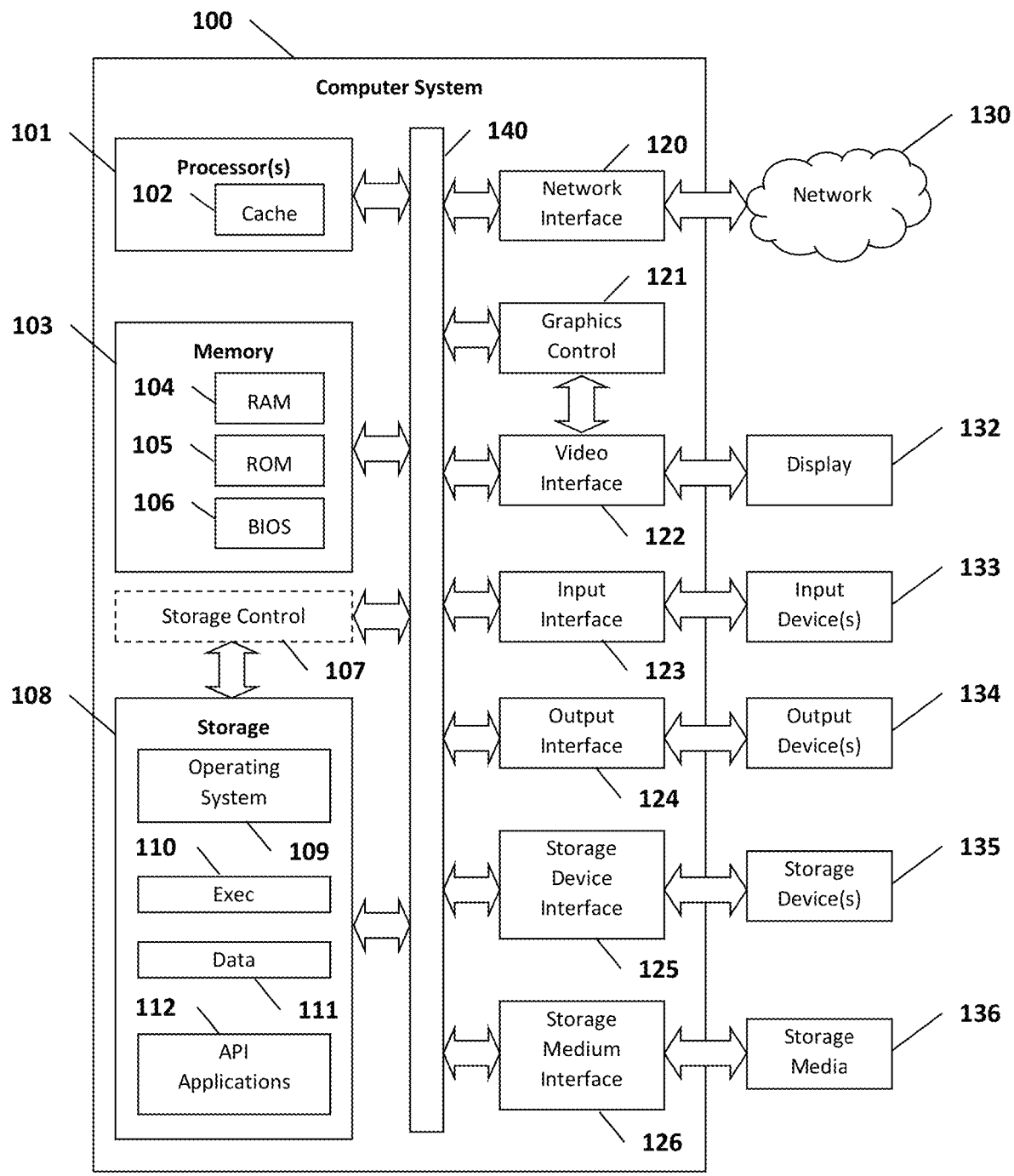
FIG. 1 shows a non-limiting example of a computing device; in this case, a device with one or more processors, memory, storage, and a network interface, per an embodiment herein.

In one aspect, disclosed herein are computer-implemented methods for detecting spoofing of biometric identity recognition using the camera of a mobile device, the method comprising: (a) recording, by a camera, a user's face image or set of images at a first distance; (b) processing the user's face image or set of images at the first distance with algorithms to generate a first data representation of the user's image or set of images; (c) processing the first data representation into a predictive model that estimates the data representations of the user's face image or set of images at other distances or orientations between the user's face and the camera; (d) changing the distance between the user's face and the camera, wherein changing the distance comprises increasing the distance between the user's face and the camera, decreasing the distance between the user's face and the camera, changing the orientation of the camera in relation to the user's face, changing the orientation of the user's face in relation to the camera, or any combination thereof; (e) recording, by the camera, the user's face image or set of images at a second distance; (f) processing the user's face image or set of images at the second distance with algorithms to generate a second data representation of the user's second image or set of images; (g) comparing the second data representation with the predictive model generated from the first data representation to determine if they match; and (h) validating an identity recognition match if the second data representation matches the predictive model generated from the first data representation. In some embodiments, the method further comprises rejecting the identity recognition match if, after comparing the second data representation with the predictive model generated from the first data representation, the second data representation does not match the predictive model generated from the first data representation. In some embodiments, the method further comprises validating an additional data representation identity recognition match if the one or more additional data representations match the predictive model generated from the first data representation. In some embodiments, the method further comprises rejecting an additional data representation identity recognition match if the one or more additional data representations does not match the predictive model generated from the first data representation. In some embodiments, the method further comprises comparing additional data to determine if the user presenting the face image or set of images at the first distance is a match to the user presenting the face image or set of images at the second distance if the second data representation does not match the predictive model generated from the first data representation. In some embodiments, additional data comprises a name, password, identity number, address, geo-location, device ID, unique data characteristic of the user's software environment on the mobile device, other biometric data, predictive models of user data or biometric data, other data, or any combination thereof. In some embodiments, the method further comprising: (a) processing the second data representation into a predictive model that estimates the data representations of the user's face image or set of images at other distances or orientations between the user's face and the camera; (b) comparing the first data representation with the predictive model generated from the second data representation to determine if they match; and (c) validating an identity recognition match if the first data representation matches the predictive model generated from the second data representation. In some embodiments, the comparison of a predictive model to a data representation comprises configuring a matching architecture. In some embodiments, the comparison of a predictive model to a data representation comprises comparing a predictive model generated from a first data representation with a second data representation, comparing a predictive model generated from a second data representation with a first data representation, or any combination thereof. In some embodiments, the configuration of matching architecture changes upon successive matching exercises, or changes upon certain successive matching exercise and not others, wherein changes may be randomized between matching exercises, or be based on non-randomized determinate data or protocols, or which may not change. In some embodiments, changes to the configuration of matching architecture are based on changes being randomized between matching exercises, changes being based on non-randomized determinate data or protocols, or any combination thereof. In some embodiments, the configuration of matching architecture does not change. In some embodiments, a guided user interface is used to capture the first and/or second data representations. In some embodiments, information captured from the guided user interface is used in matching exercises. In some embodiments, the method further comprises: (a) recording, from one or more sensors on the mobile device, motion and/or location data at the time the user's face image or set of images is recorded by the camera at the first distance; (b) recording, from one or more sensors on the mobile device, motion and/or location data at the time the user's face image or set of images is recorded by the camera at the second distance; (c) comparing the motion and/or location data recorded at the first distance and motion and/or location data from the second distance with the predictive model generated from the first data representation, and the second data representation; and (d) validating an identity recognition match if (I) the second data representation matches the predictive model generated from the first data representation predictive modeling; and (II) the motion and/or location data match the expected motion and/or location data attributing to the position of the mobile device to the user's face. In some embodiments, the motion and/or location data is recorded continuously or at a plurality of intervals between the time of recording of the first data representation and the time of recording of the second data representation. In some embodiments, the method further comprising comparing (I) the motion and/or location data is recorded continuously or at a plurality of intervals between the time of recording of the first data representation and the time of recording of the second data representation with (II) the predictive model generated from the first data representation, and the second data representation. In some embodiments, the method further comprising validating an identity recognition match if (I) the second data representation matches the predictive model generated from the first data representation; and (II) the motion and/or location data recorded continuously or at a plurality of intervals match the expected motion and/or location data attributing to the position of the mobile device to the user's face. In some embodiments, the method further comprising (a) recording, from one or more sensors on the mobile device, motion and/or location data at the time the user's face image or set of images is recorded by the camera at the first distance; (b) recording, from one or more sensors on the mobile device, motion and/or location data at the time the user's face image or set of images is recorded by the camera at the second distance; (c) comparing the motion and/or location data recorded at the first distance and motion and/or location data from the second distance with the predictive model generated from the second data representation, and the first data representation; and; and (d) validating an identity recognition match if (I) the first data representation matches the predictive model generated from the second data representation predictive modeling; and (II) the motion and/or location data match the expected motion and/or location data attributing to the position of the mobile device to the user's face. In some embodiments, the motion and/or location data is recorded continuously or at a plurality of intervals between the time of recording of the first data representation and the time of recording of the second data representation. In some embodiments, the method further comprises comparing the (I) the motion and/or location data is recorded continuously or at a plurality of intervals between the time of recording of the first data representation and the time of recording of the second data representation with (II) the predictive model generated from the second data representation, and the first data representation. In some embodiments, the method further comprises validating an identity recognition match if (I) the first data representation matches the predictive model generated from the second data representation; and (II) the motion and/or location data recorded continuously or at a plurality of intervals match the expected motion and/or location data attributing to the position of the mobile device to the user's face.

In another aspect, disclosed herein are computer-implemented systems comprising a computing device comprising at least one processor, an operating system configured to perform executable instructions, a memory, and a computer program including instructions executable by the computing device to create an application for detecting spoofing of biometric identity recognition using the camera of a mobile device, the application comprising: (a) a software module configured to record a user's face image or set of images at a first distance; (b) a software module configured to process the user's face image or set of images at the first distance with algorithms to generate a first data representation of the user's image or set of images; (c) a software module configured to process the first data representation into a predictive model that estimates the data representations of the user's face image or set of images at other distances or orientations between the user's face and the camera; (d) a software module configured to change the distance between the user's face and the camera, wherein changing the distance comprises increasing the distance between the user's face and the camera, decreasing the distance between the user's face and the camera, changing the orientation of the camera in relation to the user's face, changing the orientation of the user's face in relation to the camera, or any combination thereof; (e) a software module configured to record the user's face image or set of images at a second distance; (f) a software module configured to process the user's face image or set of images at the second distance with algorithms to generate a second data representation of the user's second image or set of images; (g) a software module configured to compare the second data representation with the predictive model generated from the first data representation to determine if they match; and (h) a software module configured to validate an identity recognition match if the second data representation matches the predictive model generated from the first data representation. In some embodiments, the system further comprises a software module configured to reject the identity recognition match if, after the software module configured to compare the second data representation with the predictive model generated from the first data representation, the second data representation does not match the predictive model generated from the first data representation. In some embodiments, the system further comprising a software module configured to capture one or more additional data representations from the user's face image or set of images from the first or second distance, and compare the captured one or more additional data representations with the predictive model generated from the first data representation to determine if they match if, after comparing the second data representation with the predictive model generated from the first data representation, the second data representation does not match the predictive model generated from the first data representation. In some embodiments, the system further comprising a software module configured to validate an additional data representation identity recognition match if the one or more additional data representations match the predictive model generated from the first data representation. In some embodiments, the system further comprising a software module configured to reject an additional data representation identity recognition match if the one or more additional data representations does not match the predictive model generated from the first data representation. In some embodiments, the system further comprising a software module configured to compare additional data to determine if the user presenting the face image or set of images at the first distance is a match to the user presenting the face image or set of images at the second distance if the second data representation does not match the predictive model generated from the first data representation. In some embodiments, additional data comprises a name, password, identity number, address, geo-location, device ID, unique data characteristic of the user's software environment on the mobile device, other biometric data, predictive models of user data or biometric data, other data, or any combination thereof. In some embodiments, the system further comprises: (a) a software module configured to process the second data representation into a predictive model that estimates the data representations of the user's face image or set of images at other distances or orientations between the user's face and the camera; (b) a software module configured to compare the first data representation with the predictive model generated from the second data representation to determine if they match; and (c) a software module configured to validate an identity recognition match if the first data representation matches the predictive model generated from the second data representation. In some embodiments, the software module configured to compare the first data representation with the predictive model generated from the second data representation comprises a matching architecture configuration. In some embodiments, any software module configured to compare a predictive model to a data representation comprises comparing a predictive model generated from a first data representation with a second data representation, comparing a predictive model generated from a second data representation with a first data representation, or any combination thereof. In some embodiments, the configuration of matching architecture changes upon successive matching exercises, or changes upon certain successive matching exercise and not others, wherein changes may be randomized between matching exercises, or be based on non-randomized determinate data or protocols, or which may not change. In some embodiments, changes to the configuration of matching architecture are based on changes being randomized between matching exercises, changes being based on non-randomized determinate data or protocols, or any combination thereof. In some embodiments, the matching architecture configuration does not change. In some embodiments, the system further comprises a guided user interface used to capture the first and/or second data representations. In some embodiments, information captured from the guided user interface is used in matching exercises. In some embodiments, the system further comprises: (a) a software module configured to record, from one or more sensors on the mobile device, motion and/or location data at the time the user's face image or set of images is recorded by the camera at the first distance; (b) a software module configured to record, from one or more sensors on the mobile device, motion and/or location data at the time the user's face image or set of images is recorded by the camera at the second distance; (c) a software module configured to compare the motion and/or location data recorded at the first distance and motion and/or location data from the second distance with the predictive model generated from the first data representation, and the second data representation; and (d) a software module configured to validate an identity recognition match if (I) the second data representation matches the predictive model generated from the first data representation predictive modeling; and (II) the motion and/or location data match the expected motion and/or location data attributing to the position of the mobile device to the user's face. In some embodiments, the motion and/or location data is recorded continuously or at a plurality of intervals between the time of recording of the first data representation and the time of recording of the second data representation. In some embodiments, the system further comprising a software module configured to compare (I) the motion and/or location data is recorded continuously or at a plurality of intervals between the time of recording of the first data representation and the time of recording of the second data representation with (II) the predictive model generated from the first data representation, and the second data representation. In some embodiments, the system further comprising a software module configured to validate an identity recognition match if (I) the second data representation matches the predictive model generated from the first data representation; and (II) the motion and/or location data recorded continuously or at a plurality of intervals match the expected motion and/or location data attributing to the position of the mobile device to the user's face. In some embodiments, the system further comprising: (a) a software module configured to record, from one or more sensors on the mobile device, motion and/or location data at the time the user's face image or set of images is recorded by the camera at the first distance; (b) a software module configured to record, from one or more sensors on the mobile device, motion and/or location data at the time the user's face image or set of images is recorded by the camera at the second distance; (c) a software module configured to compare the motion and/or location data recorded at the first distance and motion and/or location data from the second distance with the predictive model generated from the second data representation, and the first data representation; and (d) a software module configured to validate an identity recognition match if (I) the first data representation matches the predictive model generated from the second data representation predictive modeling; and (II) the motion and/or location data match the expected motion and/or location data attributing to the position of the mobile device to the user's face. In some embodiments, the motion and/or location data is recorded continuously or at a plurality of intervals between the time of recording of the first data representation and the time of recording of the second data representation. In some embodiments, the system further comprising a software module configured to compare the (I) the motion and/or location data is recorded continuously or at a plurality of intervals between the time of recording of the first data representation and the time of recording of the second data representation with (II) the predictive model generated from the second data representation, and the first data representation. In some embodiments, the system further comprising a software module configured to validate an identity recognition match if (I) the first data representation matches the predictive model generated from the second data representation; and (II) the motion and/or location data recorded continuously or at a plurality of intervals match the expected motion and/or location data attributing to the position of the mobile device to the user's face.

In yet another aspect, disclosed herein are non-transitory computer-readable storage media encoded with a computer program including instructions executable by one or more processors to create an application for detecting spoofing of biometric identity recognition using the camera of a mobile device, the application comprising: (a) a software module configured to record a user's face image or set of images at a first distance; (b) a software module configured to process the user's face image or set of images at the first distance with algorithms to generate a first data representation of the user's image or set of images; (c) a software module configured to process the first data representation into a predictive model that estimates the data representations of the user's face image or set of images at other distances or orientations between the user's face and the camera; (d) a software module configured to change the distance between the user's face and the camera, wherein changing the distance comprises increasing the distance between the user's face and the camera, decreasing the distance between the user's face and the camera, changing the orientation of the camera in relation to the user's face, changing the orientation of the user's face in relation to the camera, or any combination thereof; (e) a software module configured to record the user's face image or set of images at a second distance; (f) a software module configured to process the user's face image or set of images at the second distance with algorithms to generate a second data representation of the user's second image or set of images; (g) a software module configured to compare the second data representation with the predictive model generated from the first data representation to determine if they match; and (h) a software module configured to validate an identity recognition match if the second data representation matches the predictive model generated from the first data representation. In some embodiments, the media further comprises a software module configured to reject the identity recognition match if, after the software module configured to compare the second data representation with the predictive model generated from the first data representation, the second data representation does not match the predictive model generated from the first data representation. In some embodiments, the media further comprising a software module configured to capture one or more additional data representations from the user's face image or set of images from the first or second distance, and compare the captured one or more additional data representations with the predictive model generated from the first data representation to determine if they match if, after comparing the second data representation with the predictive model generated from the first data representation, the second data representation does not match the predictive model generated from the first data representation. In some embodiments, the media further comprising a software module configured to validate an additional data representation identity recognition match if the one or more additional data representations match the predictive model generated from the first data representation. In some embodiments, the media further comprising a software module configured to reject an additional data representation identity recognition match if the one or more additional data representations does not match the predictive model generated from the first data representation. In some embodiments, the media further comprising a software module configured to compare additional data to determine if the user presenting the face image or set of images at the first distance is a match to the user presenting the face image or set of images at the second distance if the second data representation does not match the predictive model generated from the first data representation. In some embodiments, additional data comprises a name, password, identity number, address, geo-location, device ID, unique data characteristic of the user's software environment on the mobile device, other biometric data, predictive models of user data or biometric data, other data, or any combination thereof. In some embodiments, the media further comprises: (a) a software module configured to process the second data representation into a predictive model that estimates the data representations of the user's face image or set of images at other distances or orientations between the user's face and the camera; (b) a software module configured to compare the first data representation with the predictive model generated from the second data representation to determine if they match; and (c) a software module configured to validate an identity recognition match if the first data representation matches the predictive model generated from the second data representation. In some embodiments, the software module configured to compare the first data representation with the predictive model generated from the second data representation comprises a matching architecture configuration. In some embodiments, a software module configured to compare a predictive model to a data representation comprises comparing a predictive model generated from a first data representation with a second data representation, comparing a predictive model generated from a second data representation with a first data representation, or any combination thereof. In some embodiments, the configuration of matching architecture changes upon successive matching exercises, or changes upon certain successive matching exercise and not others, wherein changes may be randomized between matching exercises, or be based on non-randomized determinate data or protocols, or which may not change. In some embodiments, changes to the configuration of matching architecture are based on changes being randomized between matching exercises, changes being based on non-randomized determinate data or protocols, or any combination thereof. In some embodiments, the configuration of matching architecture does not change. In some embodiments, the media further comprises a guided user interface used to capture the first and/or second data representations. In some embodiments, information captured from the guided user interface is used in matching exercises. In some embodiments, the media further comprising: (a) a software module configured to record, from one or more sensors on the mobile device, motion and/or location data at the time the user's face image or set of images is recorded by the camera at the first distance; (b) a software module configured to record, from one or more sensors on the mobile device, motion and/or location data at the time the user's face image or set of images is recorded by the camera at the second distance; (c) a software module configured to compare the motion and/or location data recorded at the first distance and motion and/or location data from the second distance with the predictive model generated from the first data representation, and the second data representation; and (d) a software module configured to validate an identity recognition match if (I) the second data representation matches the predictive model generated from the first data representation predictive modeling; and (II) the motion and/or location data match the expected motion and/or location data attributing to the position of the mobile device to the user's face. In some embodiments, the motion and/or location data is recorded continuously or at a plurality of intervals between the time of recording of the first data representation and the time of recording of the second data representation. In some embodiments, the media further comprising a software module configured to compare (I) the motion and/or location data is recorded continuously or at a plurality of intervals between the time of recording of the first data representation and the time of recording of the second data representation with (II) the predictive model generated from the first data representation, and the second data representation. In some embodiments, the media further comprising a software module configured to validate an identity recognition match if (I) the second data representation matches the predictive model generated from the first data representation; and (II) the motion and/or location data recorded continuously or at a plurality of intervals match the expected motion and/or location data attributing to the position of the mobile device to the user's face. In some embodiments, the media further comprising: (a) a software module configured to record, from one or more sensors on the mobile device, motion and/or location data at the time the user's face image or set of images is recorded by the camera at the first distance; (b) a software module configured to record, from one or more sensors on the mobile device, motion and/or location data at the time the user's face image or set of images is recorded by the camera at the second distance; (c) a software module configured to compare the motion and/or location data recorded at the first distance and motion and/or location data from the second distance with the predictive model generated from the second data representation, and the first data representation; and (d) a software module configured to validate an identity recognition match if (I) the first data representation matches the predictive model generated from the second data representation predictive modeling; and (II) the motion and/or location data match the expected motion and/or location data attributing to the position of the mobile device to the user's face. In some embodiments, the motion and/or location data is recorded continuously or at a plurality of intervals between the time of recording of the first data representation and the time of recording of the second data representation. In some embodiments, the media further comprising a software module configured to compare the (I) the motion and/or location data is recorded continuously or at a plurality of intervals between the time of recording of the first data representation and the time of recording of the second data representation with (II) the predictive model generated from the second data representation, and the first data representation. In some embodiments, the media further comprising a software module configured to validate an identity recognition match if (I) the first data representation matches the predictive model generated from the second data representation; and (II) the motion and/or location data recorded continuously or at a plurality of intervals match the expected motion and/or location data attributing to the position of the mobile device to the user's face.

Provided herein is a method for detecting spoofing of biometric identity recognition using the camera of a mobile device, wherein: a user's face image or set of images is recorded by the camera at a first distance; the user's face image or set of images at the first distance is processed with algorithms to generate a first data representation of the user's image or set of images; the first data representation is processed into a predictive model that estimates the data representations of the user's face image or set of images at other distances or orientations between the user's face and the camera; the distance between the user's face and the camera changes, whether moving closer together, or further away, and/or with changes in orientation of the face to the camera; the user's face image or set of images is recorded by the camera at a second distance; the user's face image or set of images at the second distance is processed with algorithms to generate a second data representation of the user's second image or set of images; the second data representation is compared with the predictive model generated from the first data representation to determine if they match; and validating the identity recognition match if the second data representation matches the predictive model generated from the first data representation.

In some embodiments of the method, upon comparing the second data representation with the predictive model generated from the first data representation, if the second data representation does not match the predictive model generated from the first data representation, rejecting the identity recognition match.

In some embodiments of the method, where upon comparing the second data representation with the predictive model generated from the first data representation, if the second data representation does not match the predictive model generated from the first data representation, allowing the capture of additional data representation(s) from the user's face image or set of images, and comparing the additional data representation(s) with the predictive model generated from the first data representation to determine if they match; and validating the identity recognition match if the additional data representation(s) match the predictive model generated from the first data representation; rejecting the identity recognition match if the additional data representation(s) does not match the predictive model generated from the first data representation.

In some embodiments of the method, where upon comparing the second data representation with the predictive model generated from the first data representation, if the second data representation does not match the predictive model generated from the first data representation, comparing additional data such as name, password, identity number, address, geo-location, device ID, unique data characteristic of the user's software environment on the mobile device, other biometric data, predictive models of user data or biometric data, or other data, to determine if the user presenting the face image or set of images at the first distance is a match to the user presenting the face image or set of images at the second distance.

In some embodiments of the method, a predictive model is generated from the second data representation, and the validating of the identity recognition match is determined from a comparison of the predictive model generated from the second data representation and the first data representation.

Changing the data and software architecture for matching provides security benefits, where a dedicated attacker that comprises the system and gains access to some portion or all of the software and/or data, is less able to not able to understand how the matching is being performed, and is less able or not able to compromise the system and/or replay attack the user identity matching exercises on behalf of a user or users, which may be done as part of an effort to access information or resources, or cause changes to information or resources.

In some embodiments of the method, the configuration of matching architecture, be it from (a) a comparison of a predictive model generated from a first data representation with a second data representation, or (b) a comparison of a predictive model generated from a second data representation with a first data representation, changes upon successive matching exercises, or changes upon certain successive matching exercise and not others, which changes may be randomized between matching exercises, or be based on non-randomized determinate data or protocols, or which may not change.

In some embodiments of the method, a guided user interface is used to capture the first and/or second data representations. The guidance information used in the matching exercise.

In some embodiments of the method, the configuration of the predictive modeling architecture can be from (a) predictive modeling from a given data or data representation to generate and match another data or data representation, or (b) predictive modeling from more than one captured data or data representations to generate multiple predictions to match multiple other data or data representations, with the first data, second data and/or additional data used for predictive modeling for matching other data or data representations.

In some embodiments of the method, the configuration of the predictive modeling architecture can be optimized based on security level and speed of execution, for example in addressing data consumption, file sizes, processing steps, and other data and software architecture characteristics to change the speed of execution, which in some cases may be decided in connection with associated security specifications of the implementation.

In some embodiments of the method, the predictive model to generate one or more predictive data is trained using methods including machine learning, image analysis, deep learning, and other methods. The predictive model is trained on both real data collected from users and/or synthetic data generated by image rendering or other techniques of image data representation known in the art.

In some embodiments of the method, motion and/or location data is recorded from the sensors on the mobile device at the time the user's face image or set of images is recorded by the camera at the first distance; motion and/or location data is recorded from the sensors on the mobile device at the time the user's face image or set of images is recorded by the camera at the second distance; the motion and/or location data recorded at the first distance and the motion and/or location data recorded at the second distance are compared with the predictive model generated from the first data representation, and the second data representation; validating the identity recognition match if the second data representation matches the predictive model generated from the first data representation and if the motion and/or location data match the expected motion and/or location data attributing to the position of the mobile device to the user's face, as said position may change with movement of the mobile device and/or the movement of the user's face between the time of recording of the first data representation and the time of recording of the second data representation.

In some embodiments of the method, motion and/or location data is recorded continuously, or at a plurality of intervals, between the time of recording of the first data representation and the time of recording of the second data representation; the motion and/or location data recorded continuously, or at a plurality of intervals, between the time of recording of the first data representation and the time of recording of the second data representation, is compared with the predictive model generated from the first data representation, and the second data representation; validating the identity recognition match if the second data representation matches the predictive model generated from the first data representation and if the motion and/or location data recorded continuously, or at a plurality of intervals, match the expected motion and/or location data attributing to the position of the mobile device to the user's face, as said position may change with movement of the mobile device and/or the movement of the user's face between the time of recording of the first data representation and the time of recording of the second data representation.

In some embodiments of the method, motion and/or location data is recorded from the sensors on the mobile device at the time the user's face image or set of images is recorded by the camera at the first distance; motion and/or location data is recorded from the sensors on the mobile device at the time the user's face image or set of images is recorded by the camera at the second distance; the motion and/or location data recorded at the first distance and the motion and/or location data recorded at the second distance are compared with the predictive model generated from the second data representation, and the first data representation; validating the identity recognition match if the first data representation matches the predictive model generated from the second data representation and if the motion and/or location data match the expected motion and/or location data attributing to the position of the mobile device to the user's face, as said position may change with movement of the mobile device and/or the movement of the user's face between the time of recording of the first data representation and the time of recording of the second data representation.

In some embodiments of the method, motion and/or location data is recorded continuously, or at a plurality of intervals, between the time of recording of the first data representation and the time of recording of the second data representation; the motion and/or location data recorded continuously, or at a plurality of intervals, between the time of recording of the first data representation and the time of recording of the second data representation, is compared with the predictive model generated from the second data representation, and the first data representation; validating the identity recognition match if the first data representation matches the predictive model generated from the second data representation and if the motion and/or location data recorded continuously, or at a plurality of intervals, match the expected motion and/or location data attributing to the position of the mobile device to the user's face, as said position may change with movement of the mobile device and/or the movement of the user's face between the time of recording of the first data representation and the time of recording of the second data representation.

Terms and Definitions

Unless otherwise defined, all technical terms used herein have the same meaning as commonly understood by one of ordinary skill in the art to which this disclosure belongs.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by 10%, 5%, or 1%, including increments therein.

As used herein, the term "about" in reference to a percentage refers to an amount that is greater or less the stated percentage by 10%, 5%, or 1%, including increments therein.

As used herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Computing System

Referring to FIG. 1, a block diagram is shown depicting an exemplary machine that includes a computer system 100 (e.g., a processing or computing system) within which a set of instructions can execute for causing a device to perform or execute any one or more of the aspects and/or methodologies for static code scheduling of the present disclosure. The components in FIG. 1 are examples only and do not limit the scope of use or functionality of any hardware, software, embedded logic component, or a combination of two or more such components implementing particular embodiments.

Computer system 100 may include one or more processors 101, a memory 103, and a storage 108 that communicate with each other, and with other components, via a bus 140. The bus 140 may also link a display 132, one or more input devices 133 (which may, for example, include a keypad, a keyboard, a mouse, a stylus, etc.), one or more output devices 134, one or more storage devices 135, and various tangible storage media 136. All of these elements may interface directly or via one or more interfaces or adaptors to the bus 140. For instance, the various tangible storage media 136 can interface with the bus 140 via storage medium interface 126. Computer system 100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 100 includes one or more processor(s) 101 (e.g., central processing units (CPUs) or general purpose graphics processing units (GPGPUs)) that carry out functions. Processor(s) 101 optionally contains a cache memory unit 102 for temporary local storage of instructions, data, or computer addresses. Processor(s) 101 are configured to assist in execution of computer readable instructions. Computer system 100 may provide functionality for the components depicted in FIG. 1 as a result of the processor(s) 101 executing non-transitory, processor-executable instructions embodied in one or more tangible computer-readable storage media, such as memory 103, storage 108, storage devices 135, and/or storage medium 136. The computer-readable media may store software that implements particular embodiments, and processor(s) 101 may execute the software. Memory 103 may read the software from one or more other computer-readable media (such as mass storage device(s) 135, 136) or from one or more other sources through a suitable interface, such as network interface 120. The software may cause processor(s) 101 to carry out one or more processes or one or more steps of one or more processes described or illustrated herein. Carrying out such processes or steps may include defining data structures stored in memory 103 and modifying the data structures as directed by the software.

The memory 103 may include various components (e.g., machine readable media) including, but not limited to, a random access memory component (e.g., RAM 104) (e.g., static RAM (SRAM), dynamic RAM (DRAM), ferroelectric random access memory (FRAM), phase-change random access memory (PRAM), etc.), a read-only memory component (e.g., ROM 105), and any combinations thereof. ROM 105 may act to communicate data and instructions unidirectionally to processor(s) 101, and RAM 104 may act to communicate data and instructions bidirectionally with processor(s) 101. ROM 105 and RAM 104 may include any suitable tangible computer-readable media described below. In one example, a basic input/output system 106 (BIOS), including basic routines that help to transfer information between elements within computer system 100, such as during start-up, may be stored in the memory 103.

Fixed storage 108 is connected bidirectionally to processor(s) 101, optionally through storage control unit 107. Fixed storage 108 provides additional data storage capacity and may also include any suitable tangible computer-readable media described herein. Storage 108 may be used to store operating system 109, executable(s) 110, data 111, applications 112 (application programs), and the like. Storage 108 can also include an optical disk drive, a solid-state memory device (e.g., flash-based systems), or a combination of any of the above. Information in storage 108 may, in appropriate cases, be incorporated as virtual memory in memory 103.

In one example, storage device(s) 135 may be removably interfaced with computer system 100 (e.g., via an external port connector (not shown)) via a storage device interface 125. Particularly, storage device(s) 135 and an associated machine-readable medium may provide non-volatile and/or volatile storage of machine-readable instructions, data structures, program modules, and/or other data for the computer system 100. In one example, software may reside, completely or partially, within a machine-readable medium on storage device(s) 135. In another example, software may reside, completely or partially, within processor(s) 101.

Bus 140 connects a wide variety of subsystems. Herein, reference to a bus may encompass one or more digital signal lines serving a common function, where appropriate. Bus 140 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 100 may also include an input device 133. In one example, a user of computer system 100 may enter commands and/or other information into computer system 100 via input device(s) 133. Examples of an input device(s) 133 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 133 may be interfaced to bus 140 via any of a variety of input interfaces 123 (e.g., input interface 123) including, but not limited to, serial, parallel, game port, USB, FIREWIRE, THUNDERBOLT, or any combination of the above.

In particular embodiments, when computer system 100 is connected to network 130, computer system 100 may communicate with other devices, specifically mobile devices and enterprise systems, distributed computing systems, cloud storage systems, cloud computing systems, and the like, connected to network 130. Communications to and from computer system 100 may be sent through network interface 120. For example, network interface 120 may receive incoming communications (such as requests or responses from other devices) in the form of one or more packets (such as Internet Protocol (IP) packets) from network 130, and computer system 100 may store the incoming communications in memory 103 for processing. Computer system 100 may similarly store outgoing communications (such as requests or responses to other devices) in the form of one or more packets in memory 103 and communicated to network 130 from network interface 120. Processor(s) 101 may access these communication packets stored in memory 103 for processing.

Examples of the network interface 120 include, but are not limited to, a network interface card, a modem, and any combination thereof. Examples of a network 130 or network segment 130 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 130, may employ a wired and/or a wireless mode of communication. In general, any network topology may be used.

Information and data can be displayed through a display 132. Examples of a display 132 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 132 can interface to the processor(s) 101, memory 103, and fixed storage 108, as well as other devices, such as input device(s) 133, via the bus 140. The display 132 is linked to the bus 140 via a video interface 122, and transport of data between the display 132 and the bus 140 can be controlled via the graphics control 121. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 132, computer system 100 may include one or more other peripheral output devices 134 including, but not limited to, an audio speaker, a printer, a storage device, and any combinations thereof. Such peripheral output devices may be connected to the bus 140 via an output interface 124. Examples of an output interface 124 include, but are not limited to, a serial port, a parallel connection, a USB port, a FIREWIRE port, a THUNDERBOLT port, and any combinations thereof.

In addition, or as an alternative, computer system 100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 2:
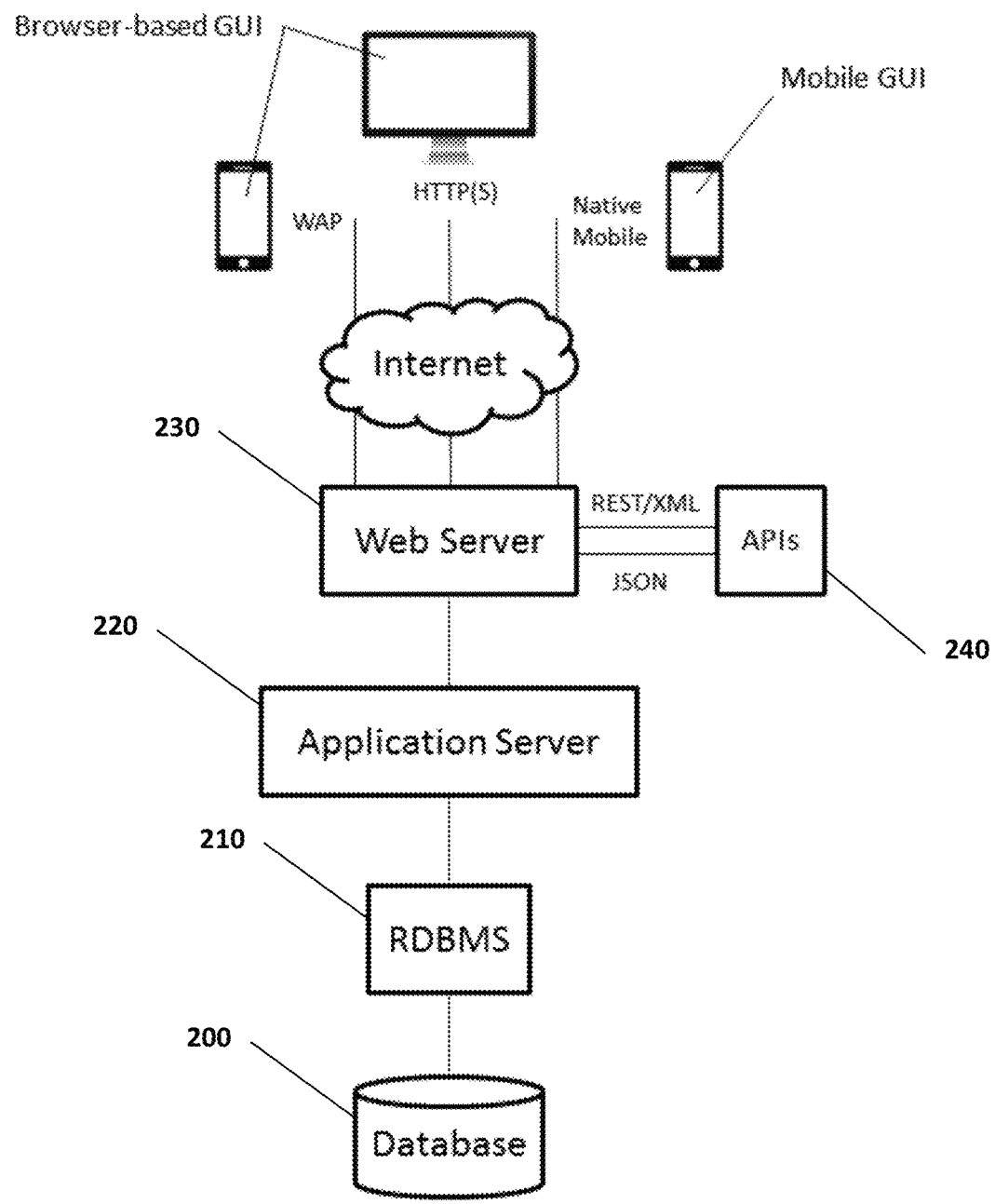
FIG. 2 shows a non-limiting example of a web/mobile application provision system; in this case, a system providing browser-based and/or native mobile user interfaces, per an embodiment herein.

Referring to FIG. 2, in a particular embodiment, an application provision system comprises one or more databases 200 accessed by a relational database management system (RDBMS) 210. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 220 (such as Java servers, .NET servers, PHP servers, and the like) and one or more web servers 230 (such as Apache, IIS, GWS and the like). The web server(s) optionally expose one or more web services via app application programming interfaces (APIs) 240. Via a network, such as the Internet, the system provides browser-based and/or mobile native user interfaces.

Figure 3:
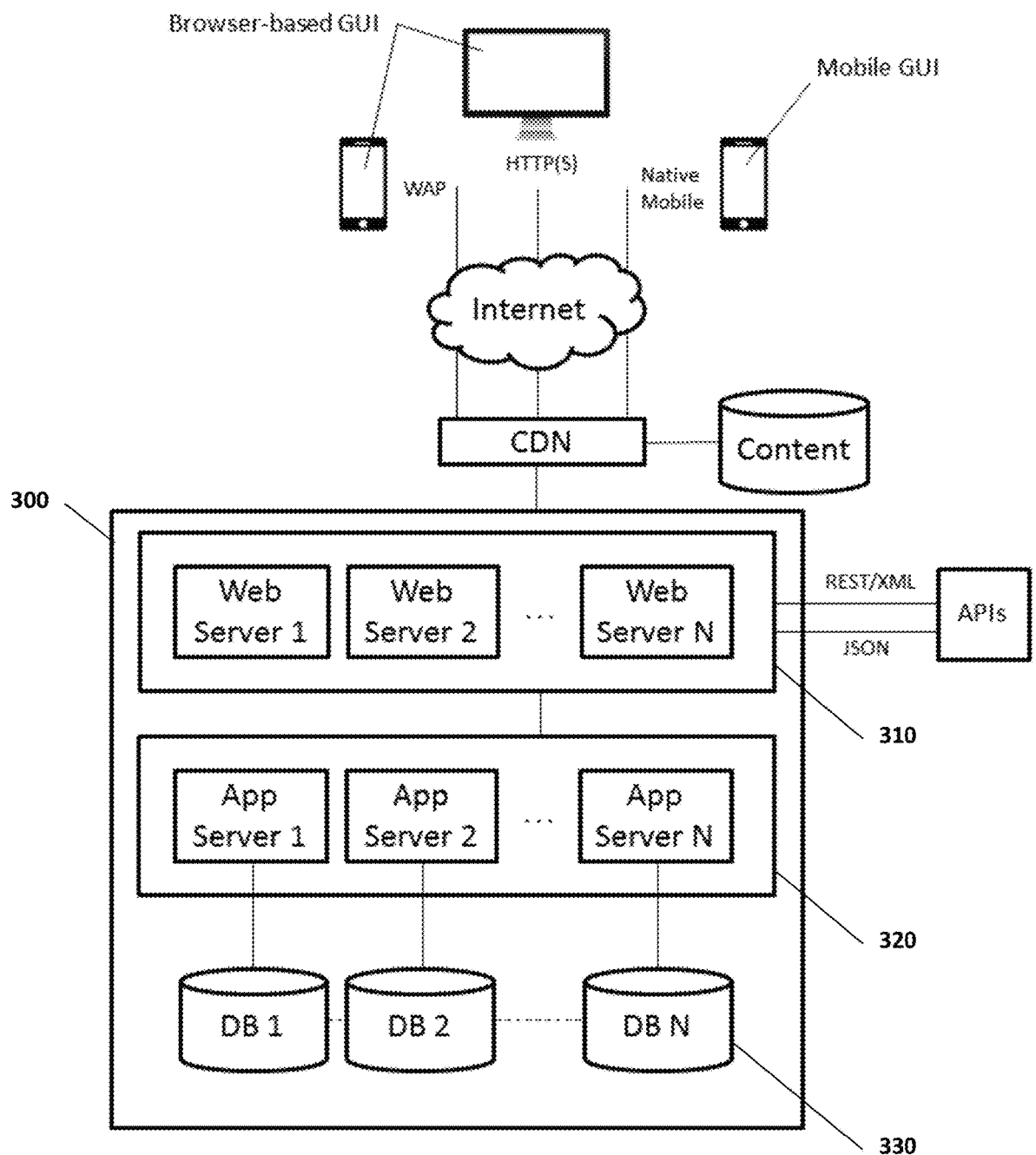
FIG. 3 shows a non-limiting example of a cloud-based web/mobile application provision system; in this case, a system comprising an elastically load balanced, auto-scaling web server and application server resources as well as synchronously replicated databases, per an embodiment herein.

Referring to FIG. 3, in a particular embodiment, an application provision system alternatively has a distributed, cloud-based architecture 300 and comprises elastically load balanced, auto-scaling web server resources 310 and application server resources 320 as well synchronously replicated databases 330.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In a particular embodiment, a database is a distributed database. In other embodiments, a database is based on one or more local computer storage devices.

Methods and Systems for Detecting Spoofing of Facial Recognition in Connection with Mobile Devices Novel and unique data and software architectures for detecting spoofing attempts provides may security benefits, such as, for instance, to deter a dedicated attacker. Such systems and methods herein include specific identification matching and confirmation algorithms that cannot be directly accessed and/or tampered by even any such attacker who has obtained access to at least a portion of a security software and/or data.

Figure 4:
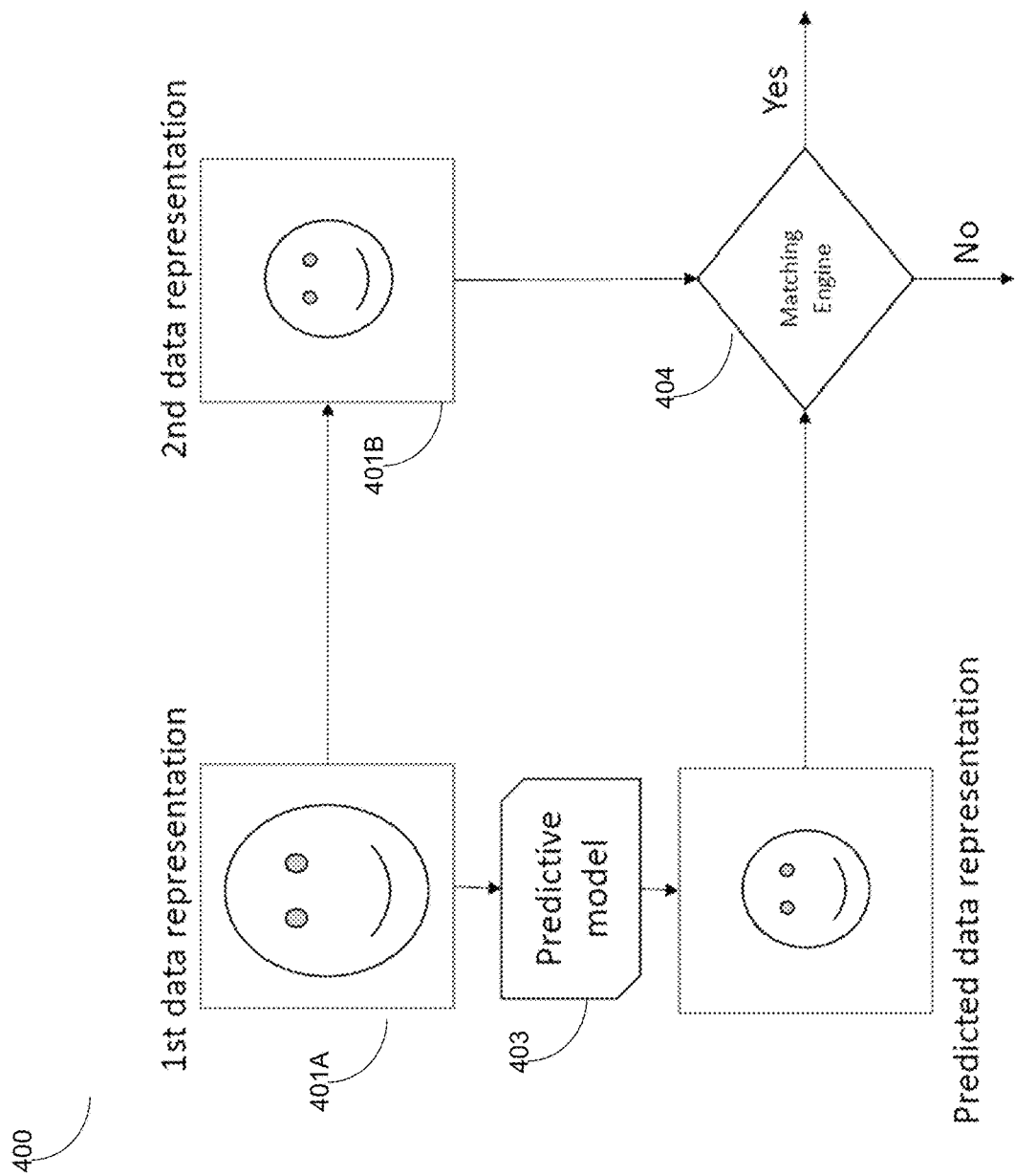
FIG. 4 shows a non-limiting example of a first and second data predictive matching architecture, per an embodiment herein.
Figure 5:
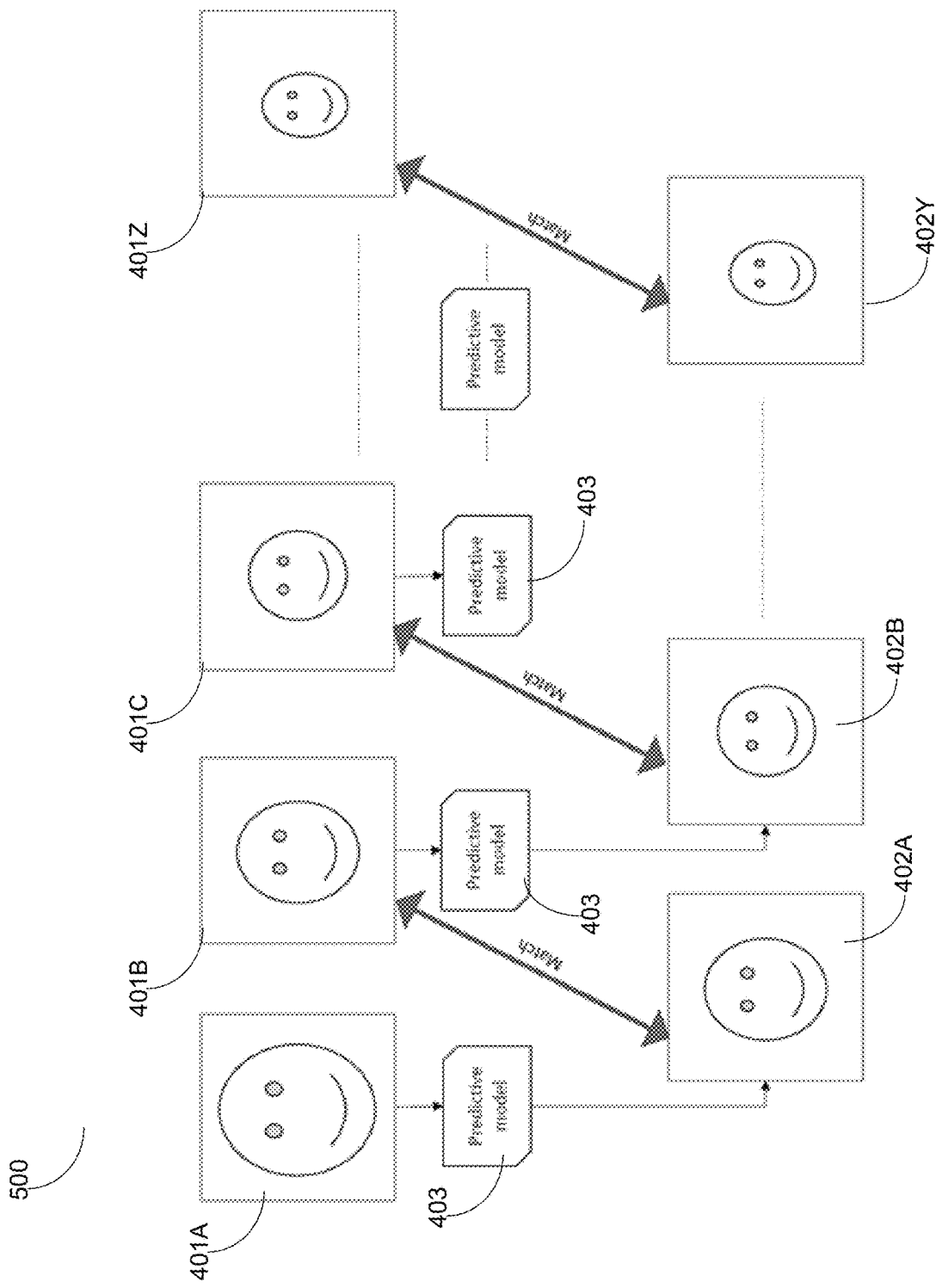
FIG. 5 shows a non-limiting example of a continuous data predictive matching architecture, per an embodiment herein.
Figure 6:
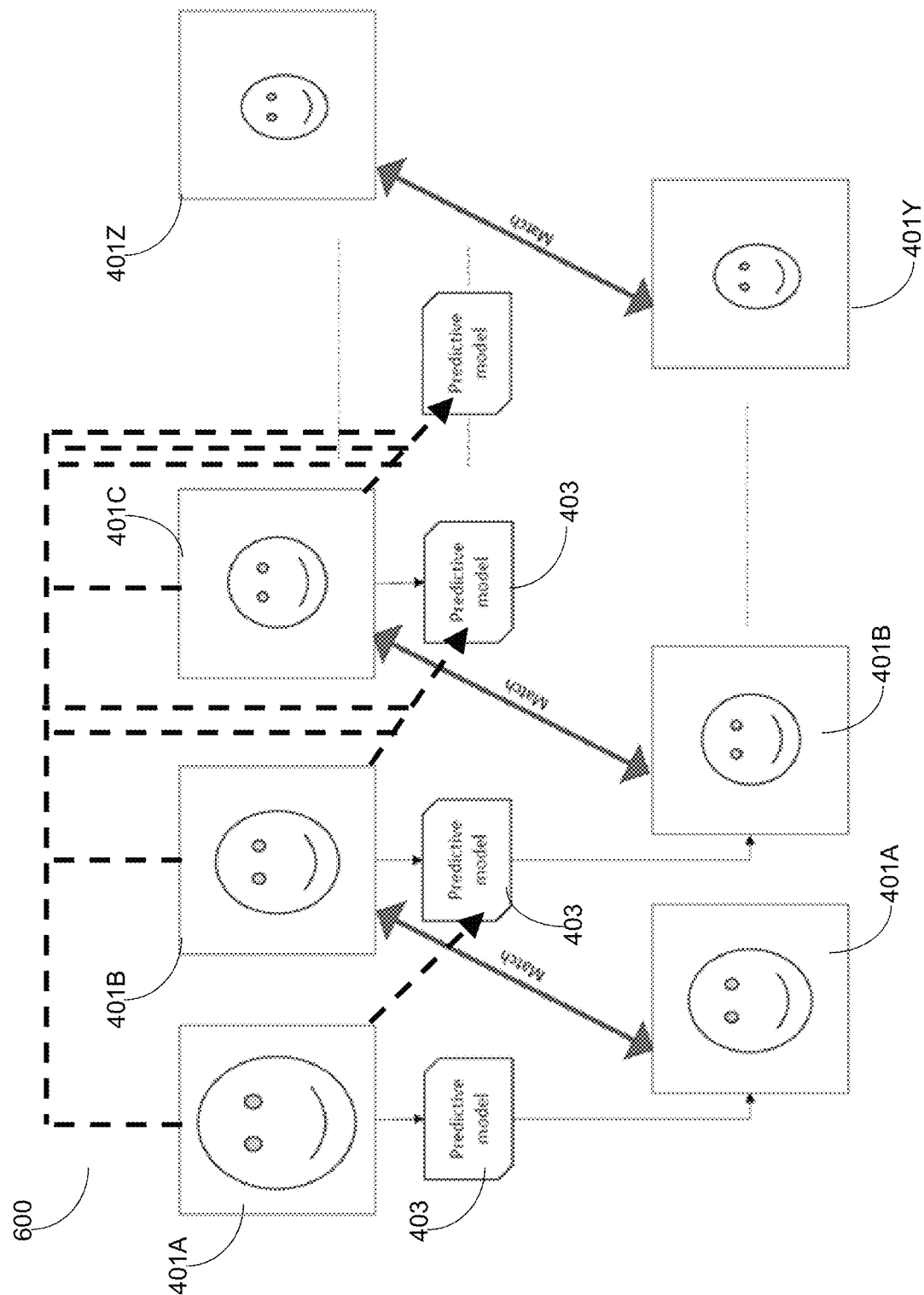
FIG. 6 shows a non-limiting example of a continuous data predictive matching architecture; in this case an architecture using multiple past frames, per an embodiment herein.

Provided herein per FIGS. 4-6 is a method for detecting spoofing of biometric identity recognition using the camera of a mobile device. In some embodiments, the method comprises: recording, by the camera of the mobile device, a first image of a face of a user; generating a first data representation 401A of the face of the user from the first image; forming 403 a predictive model 402A from the first data representation 401A; recording, by the camera of the mobile device, a second image of the face of the user; generating a second data representation 401B of the face of the user from the second image; and determining 404 if the second data representation 401B matches the predictive model 402A.

The first image of the face of the user may be captured when the camera is a first distance from the user. The second image of the face of the user may be captured when the camera is a second distance from the user. The first distance may be greater than the second distance. The second distance can be greater than the first distance. The first distance may be greater than the second distance by 5%, 10%, 15%, 20%, 25%, 30%, 35%, 40%, 45%, 50%, 60%, 70%, 80%, 90%, 100%, or more, including increments therein. The second distance may be greater than the first distance by 5%, 10%, 15%, 20%, 25%, 30%, 35%, 40%, 45%, 50%, 60%, 70%, 80%, 90%, 100%, or more, including increments therein. At least one of the first distance and the second distance may be measured as a minimal distance to the face of the user, a normal distance to the face of the user, a minimal distance to the nose of the user, or a normal distance to the nose of the user.

The first image of the face of the user may be captured when the camera is at a first orientation relative to the user. The second image of the face of the user may be captured when the camera is at a second orientation relative to the user. The first orientation may comprise a first pitch angle, a first yaw angle, a first roll angle, or any combination thereof, with respect to the user. The second orientation may comprise a second pitch angle, a second yaw angle, a second roll angle, or any combination thereof, with respect to the user. The first pitch angle, the second pitch angle, or both may be measured about an axis parallel to the ground and parallel to a forward direction of the user. The first yaw angle, the second yaw angle, or both may be measured about an axis perpendicular to the ground. The first roll angle, the second roll angle, or both may be measured about an axis parallel to the ground and perpendicular to a forward direction of the user. At least one of the first pitch angle, the first yaw angle, and the first roll angle may be greater than one or more of the second pitch angle, the second yaw angle, and the second roll angle. At least one of the first pitch angle, the first yaw angle, and the first roll angle may be greater than one or more of the second pitch angle, the second yaw angle, and the second roll angle by 5%, 10%, 15%, 20%, 25%, 30%, 35%, 40%, 45%, 50%, 60%, 70%, 80%, 90%, 100%, or more, including increments therein. At least one of the second pitch angle, the second yaw angle, and the second roll angle may be greater than one or more of the first pitch angle, the first yaw angle, and the first roll angle. At least one of the second pitch angle, the second yaw angle, and the second roll angle may be greater than one or more of the first pitch angle, the first yaw angle, and the first roll angle by 5%, 10%, 15%, 20%, 25%, 30%, 35%, 40%, 45%, 50%, 60%, 70%, 80%, 90%, 100%, or more, including increments therein.

Determining 404 if the second data representation 401B matches the predictive model 402A can be performed by comparing the second data representation 401B to the predictive model 402A. If the second data representation 401B does not match the predictive model 402A an identity match of the user can be rejected. An identity match that is rejected can indicate a spoofing attempt. If the second data representation 401B does match the predictive model 402A an identity match of the user can be confirmed. An identity match that is confirm can indicate a lack of a spoofing attempt.

Additionally or alternatively, the method may further comprise capturing a third image of the face of the user, generating a third data representation 401C of the face of the user from the third image, and determining 404 if the third data representation 401C matches the predictive model 402A. Additionally or alternatively, if the second data representation 401B does not match the predictive model 402A the method may further comprise capturing a third image of the face of the user, generating a third data representation 401C of the face of the user from the third image, and determining 404 if the third data representation 401C matches the predictive model 402A.

Additionally, or alternatively, if the second data representation 401B does not match the predictive model 402A the method may further comprise accepting an input provided by the user matches an additional data associated with the user. Additionally, or alternatively, if the third data representation 401C does not match the predictive model 402A the method may further comprise accepting an input provided by the user matches an additional data associated with the user.

The method may further comprise capturing a motion data of the user, a location data of the user, or both. In such cases, the method may further comprise accepting the user if the motion data of the user is within a predetermined range from a set motion, accepting the user if the location data of the user is within a predetermined range from a set location, or both. In such cases, the method may further comprise rejecting the user if the motion data of the user is not within a predetermined range from a set motion, rejecting the user if the location data of the user is not within a predetermined range from a set location, or both.

The user may capture the first image, the second image, the third image, or any combination thereof via a guided user interface on the mobile device.

Validating the identity recognition match may be performed if the second data representation 401B matches the predictive model 402A generated from the first data representation 401A and/or if the motion and/or location data match the expected motion and/or location data attributing to the position of the mobile device to the user's face. Said position can change with movement of the mobile device and/or the movement of the user's face between the time of recording of the first data representation 401A and the time of recording of the second data representation 401B.

Additionally, or alternatively, if the second data representation 401B does not match the predictive model 402A, the method may further comprise accepting an additional data provided by the user, and determining 404 if the additional data matches an additional data associated with the user. Additionally, or alternatively, if the third data representation 401C does not match the predictive model 402A, the method may further comprise accepting an additional data provided by the user, and determining 404 if the additional data matches an additional data associated with the user.

Additionally, or alternatively, validating of the identity recognition match may occur if the first data representation 401A matches the predictive model 402A generated from the second data representation 401B, and if the motion and/or location data match the expected motion and/or location data attributing to the position of the mobile device. Said position may change with movement of the mobile device and/or the movement of the user's face between the time of recording of the first data representation 401A and the time of recording of the second data representation 401B.

First Data Representation

In some embodiments, the methods and systems herein record, by the camera of the mobile device, a first image of a face of a user, and generate a first data representation of the face of the user from the first image.

The first data representation may comprise: a three dimensional map of at least a portion of the face of the user, a distance between a first feature and a second feature of the face of the user, a location of a pluralities of facial features, a calculated volume of at least a portion of the face of the user, a profile curve of a portion of the face of the user, a slope map of the surface of at least a portion of the face of the user, or any combination thereof.

Second Data Representation

In some embodiments, the methods and systems herein record, by the camera of the mobile device, a second image of a face of a user, and generate a second data representation of the face of the user from the second image.

The second data representation may comprise: a three dimensional map of at least a portion of the face of the user, a distance between a second feature and a second feature of the face of the user, a location of a pluralities of facial features, a calculated volume of at least a portion of the face of the user, a profile curve of a portion of the face of the user, a slope map of the surface of at least a portion of the face of the user, or any combination thereof.

Motion and Location Data

The motion data, the location data, or both can be recorded from a sensor on the mobile device at the time of the recording of the first image, at the time of the recording of the first image, or both.

The motion the location data or both may be recorded at a single point in time. The motion the location data or both may be recorded continuously. A sequence of the motion the location data or both may be recorded. A repetitive sequence of the motion the location data or both may be recorded at a set repetition interval. sequence of the motion the location data or both may begin at the time of the recording of the first image, at the time of the recording of the first image, or both. The set repetition interval may be 0.1 seconds, 0.5 seconds, 1 second, 2 seconds, 3 seconds, 4 seconds, 5 seconds, or more, including increments therein.

Predictive Model

In some cases, the predictive model is generated from the first data representation. In some cases, the predictive model is generated from the second data representation. In some cases, the predictive model is generated from the first data representation and the second data representation.

The predictive model may be generated by a machine learning algorithm, an image analysis algorithm, a deep learning algorithm, or any combination thereof. At least one of the machine learning algorithm, the image analysis algorithm, or the deep learning algorithm, may be trained using a plurality of user images. At least one of the machine learning algorithm, the image analysis algorithm, or the deep learning algorithm, may be trained using a plurality of user images and a plurality of spoofed user images. The user images may comprise public user images. The predictive model can be trained on both real data collected from users and/or synthetic data generated by image rendering or other techniques of image data representation known in the art.

The predictive model may be formed from the first data representation and at least one of the location data and the motion data.

Motion and/or location data is recorded continuously, or at a plurality of intervals, between the time of recording of the first data representation and the time of recording of the second data representation.

Matching Architecture

The configuration of the predictive modeling architecture may comprise: (a) a predictive modeling architecture derived from a given data set or data representation set to generate and match another data or data representation; or (b) a predictive modeling architecture derived from more than one captured data or data representations to generate multiple predictions that match multiple other data or data representations. In either architecture, a plurality of data sets can be used for predictive modeling to match matching data or data representations.

Alternatively, or additionally the configuration of the predictive modeling architecture may comprise: (a) a comparison between a predictive model generated from a first data representation and a predictive model generated from a second data representation; or (b) a comparison of a predictive model generated from a second data representation with a predictive model generated from a first data representation. In either architecture changes between successive matching exercises, or changes between certain successive matching exercise and not others, may be randomized between matching exercises, In either architecture changes between successive matching exercises, or changes between certain successive matching exercise and not others, may be based on non-randomized determinate data or protocols, or which may not change.

The configuration of the predictive modeling architecture can be optimized based on security level and speed of execution. For example, the predictive modeling architecture can be optimized based on data consumption, file sizes, processing steps, or any combination thereof. Such architecture characteristics can change the speed of execution depending on associated security specifications.

Additional Data Representations

The method may further comprise comparing additional data to a data submitted by the user to the mobile device. The additional data may comprise a name, a password, an identity number, an address, a geo-location, a device ID, unique data characteristic of the user's software environment on the mobile device, a biometric data, a predictive biometric data, or any combination thereof.

Additionally, or alternatively, if the second data representation does not match the predictive model the method may further comprise accepting an input provided by the user matches an additional data associated with the user. Additionally, or alternatively, if the third data representation does not match the predictive model the method may further comprise accepting an input provided by the user matches an additional data associated with the user.

What is claimed is:

1. A computer-implemented method for detecting spoofing of biometric identity recognition using the camera of a mobile device, the method comprising:
   a) recording, by the camera, a user's face image or set of images at a first distance;
   b) processing the user's face image or set of images at the first distance with algorithms to generate a first data representation of the user's image or set of images;
   c) processing the first data representation into a predictive model that estimates the data representations of the user's face image or set of images at other distances or orientations between the user's face and the camera, the predictive model generated by a machine learning algorithm, an image analysis algorithm, or a combination thereof, and trained using a plurality of user images and a plurality of spoofed user images;
   d) changing the distance between the user's face and the camera, wherein changing the distance comprises increasing the distance between the user's face and the camera, decreasing the distance between the user's face and the camera, changing the orientation of the camera in relation to the user's face, changing the orientation of the user's face in relation to the camera, or any combination thereof;
   e) recording, by the camera, the user's face image or set of images at a second distance;
   f) processing the user's face image or set of images at the second distance with algorithms to generate a second data representation of the user's second image or set of images;
   g) comparing the second data representation with the predictive model generated from the first data representation to determine if they match;
   h) validating an identity recognition match if the second data representation matches the predictive model generated from the first data representation; and
   i) comparing additional data to determine if the user presenting the face image or set of images at the first distance is a match to the user presenting the face image or set of images at the second distance if the second data representation does not match the predictive model generated from the first data representation.

2. The method of claim 1, the method further comprising rejecting the identity recognition match if, after comparing the second data representation with the predictive model generated from the first data representation, the second data representation does not match the predictive model generated from the first data representation.

3. The method of claim 1, the method further comprising capturing one or more additional data representations from the user's face image or set of images from the first or second distance, and comparing the captured one or more additional data representations with the predictive model generated from the first data representation to determine if they match if, after comparing the second data representation with the predictive model generated from the first data representation, the second data representation does not match the predictive model generated from the first data representation.

4. The method of claim 3, the method further comprising validating an additional data representation identity recognition match if the one or more additional data representations match the predictive model generated from the first data representation.

5. The method of claim 3, the method further comprising rejecting an additional data representation identity recognition match if the one or more additional data representations does not match the predictive model generated from the first data representation.

6. The method of claim 1, wherein the additional data comprises a name, password, identity number, address, geo-location, device ID, unique data characteristic of the user's software environment on the mobile device, other biometric data, predictive models of user data or biometric data, other data, or any combination thereof.

7. The method of claim 1, the method further comprising:
   a) processing the second data representation into a predictive model that estimates the data representations of the user's face image or set of images at other distances or orientations between the user's face and the camera;
   b) comparing the first data representation with the predictive model generated from the second data representation to determine if they match; and
   c) validating an identity recognition match if the first data representation matches the predictive model generated from the second data representation.

8. The method of claim 7, the method further comprising comparing a predictive model to a data representation comprises configuring a matching architecture.

9. The method of claim 7, the method further comprising comparing a predictive model to a data representation comprises comparing a predictive model generated from a first data representation with a second data representation, comparing a predictive model generated from a second data representation with a first data representation, or any combination thereof.

10. The method of claim 8, wherein the configuration of matching architecture changes upon successive matching exercises, or changes upon certain successive matching exercise and not others.

11. The method of claim 10, wherein changes to the configuration of matching architecture are based on changes being randomized between matching exercises, changes being based on non-randomized determinate data or protocols, or any combination thereof.

12. The method of claim 8, wherein the configuration of matching architecture does not change.

13. The method of claim 1, wherein a guided user interface is used to capture the first and/or second data representations.

14. The method of claim 13, wherein information captured from the guided user interface is used in matching exercises.

15. The method of claim 1, the method further comprising:
   a) recording, from one or more sensors on the mobile device, motion and/or location data at the time the user's face image or set of images is recorded by the camera at the first distance;
   b) recording, from one or more sensors on the mobile device, motion and/or location data at the time the user's face image or set of images is recorded by the camera at the second distance;
   c) comparing the motion and/or location data recorded at the first distance and motion and/or location data from the second distance with the predictive model generated from the first data representation, and the second data representation; and
   d) validating an identity recognition match if (I) the second data representation matches the predictive model generated from the first data representation predictive modeling; and (II) the motion and/or location data match the expected motion and/or location data attributing to the position of the mobile device to the user's face.

16. The method of claim 15, wherein the motion and/or location data is recorded continuously or at a plurality of intervals between the time of recording of the first data representation and the time of recording of the second data representation.

17. The method of claim 16, the method further comprising comparing (I) the motion and/or location data is recorded continuously or at a plurality of intervals between the time of recording of the first data representation and the time of recording of the second data representation with (II) the predictive model generated from the first data representation, and the second data representation.

18. The method of claim 17, the method further comprising validating an identity recognition match if (I) the second data representation matches the predictive model generated from the first data representation; and (II) the motion and/or location data recorded continuously or at a plurality of intervals match the expected motion and/or location data attributing to the position of the mobile device to the user's face.

19. The method of claim 7, the method further comprising:
   a) recording, from one or more sensors on the mobile device, motion and/or location data at the time the user's face image or set of images is recorded by the camera at the first distance;
   b) recording, from one or more sensors on the mobile device, motion and/or location data at the time the user's face image or set of images is recorded by the camera at the second distance;
   c) comparing the motion and/or location data recorded at the first distance and motion and/or location data from the second distance with the predictive model generated from the second data representation, and the first data representation; and
   d) validating an identity recognition match if (I) the first data representation matches the predictive model generated from the second data representation predictive modeling; and (II) the motion and/or location data match the expected motion and/or location data attributing to the position of the mobile device to the user's face.

20. The method of claim 19, wherein the motion and/or location data is recorded continuously or at a plurality of intervals between the time of recording of the first data representation and the time of recording of the second data representation.

21. The method of claim 20, the method further comprising comparing the (I) the motion and/or location data is recorded continuously or at a plurality of intervals between the time of recording of the first data representation and the time of recording of the second data representation with (II) the predictive model generated from the second data representation, and the first data representation.

22. The method of claim 21, the method further comprising validating an identity recognition match if (I) the first data representation matches the predictive model generated from the second data representation; and (II) the motion and/or location data recorded continuously or at a plurality of intervals match the expected motion and/or location data attributing to the position of the mobile device to the user's face.

23. A computer-implemented system comprising a computing device comprising at least one processor, an operating system configured to perform executable instructions, a memory, and a computer program including instructions executable by the computing device to create an application for detecting spoofing of biometric identity recognition using the camera of a mobile device, the application comprising:
   a) a software module configured to record a user's face image or set of images at a first distance;
   b) a software module configured to process the user's face image or set of images at the first distance with algorithms to generate a first data representation of the user's image or set of images;
   c) a software module configured to process the first data representation into a predictive model that estimates the data representations of the user's face image or set of images at other distances or orientations between the user's face and the camera, the predictive model generated by a machine learning algorithm, an image analysis algorithm, or a combination thereof, and trained using a plurality of user images and a plurality of spoofed user images;
   d) a software module configured to change the distance between the user's face and the camera, wherein changing the distance comprises increasing the distance between the user's face and the camera, decreasing the distance between the user's face and the camera, changing the orientation of the camera in relation to the user's face, changing the orientation of the user's face in relation to the camera, or any combination thereof;
   e) a software module configured to record the user's face image or set of images at a second distance;
   f) a software module configured to process the user's face image or set of images at the second distance with algorithms to generate a second data representation of the user's second image or set of images;
   g) a software module configured to compare the second data representation with the predictive model generated from the first data representation to determine if they match;
   h) a software module configured to validate an identity recognition match if the second data representation matches the predictive model generated from the first data representation; and
   i) a software module configured to compare additional data to determine if the user presenting the face image or set of images at the first distance is a match to the user presenting the face image or set of images at the second distance if the second data representation does not match the predictive model generated from the first data representation.

24. A non-transitory computer-readable storage media encoded with a computer program including instructions executable by one or more processors to create an application for detecting spoofing of biometric identity recognition using the camera of a mobile device, the application comprising:
   a) a software module configured to record a user's face image or set of images at a first distance;
   b) a software module configured to process the user's face image or set of images at the first distance with algorithms to generate a first data representation of the user's image or set of images;
   c) a software module configured to process the first data representation into a predictive model that estimates the data representations of the user's face image or set of images at other distances or orientations between the user's face and the camera, the predictive model generated by a machine learning algorithm, an image analysis algorithm, or a combination thereof, and trained using a plurality of user images and a plurality of spoofed user images;
   d) a software module configured to change the distance between the user's face and the camera, wherein changing the distance comprises increasing the distance between the user's face and the camera, decreasing the distance between the user's face and the camera, changing the orientation of the camera in relation to the user's face, changing the orientation of the user's face in relation to the camera, or any combination thereof;
   e) a software module configured to record the user's face image or set of images at a second distance;
   f) a software module configured to process the user's face image or set of images at the second distance with algorithms to generate a second data representation of the user's second image or set of images;
   g) a software module configured to compare the second data representation with the predictive model generated from the first data representation to determine if they match;
   h) a software module configured to validate an identity recognition match if the second data representation matches the predictive model generated from the first data representation; and
   i) a software module configured to compare additional data to determine if the user presenting the face image or set of images at the first distance is a match to the user presenting the face image or set of images at the second distance if the second data representation does not match the predictive model generated from the first data representation.

* * * * *